United States Patent [19]

Hoshi et al.

[11] Patent Number: 5,409,095
[45] Date of Patent: Apr. 25, 1995

[54] SORTING APPARATUS

[75] Inventors: Toshiomi Hoshi; Katsumi Ishihara; Hiroki Shinohara, all of Tokyo, Japan

[73] Assignee: Toyokanetsu Kabushiki Kaisha, Tokyo, Japan

[21] Appl. No.: 97,023

[22] Filed: Jul. 27, 1993

[30] Foreign Application Priority Data

Jul. 30, 1992 [JP] Japan ............... 4-053642 U
Oct. 6, 1992 [JP] Japan ............... 4-069589 U
Dec. 14, 1992 [JP] Japan ............... 4-085655 U

[51] Int. Cl.$^6$ .................................... B65G 37/00
[52] U.S. Cl. .................................... 198/372
[58] Field of Search ................... 198/365, 372

[56] References Cited

U.S. PATENT DOCUMENTS

| 3,731,782 | 5/1973 | Del Rosso | 198/365 X |
| 4,143,752 | 3/1979 | Del Rosso | 198/365 |
| 4,738,347 | 4/1988 | Brouwer et al. | |
| 4,884,677 | 12/1989 | Yu et al. | 198/370 |
| 4,971,190 | 11/1990 | Berends et al. | 198/372 X |
| 5,027,939 | 7/1991 | Kilper et al. | 198/365 |
| 5,217,105 | 6/1993 | Sapp et al. | 198/372 |

FOREIGN PATENT DOCUMENTS

| 2528813 | 12/1983 | France | 198/365 |
| 52-12982 | 4/1977 | Japan . | |
| 59-11488 | 3/1984 | Japan . | |
| 60-10971 | 3/1985 | Japan . | |

Primary Examiner—Cheryl L. Gastineau
Attorney, Agent, or Firm—Sughrue, Mion, Zinn, Macpeak & Seas

[57] ABSTRACT

A change-over device is provided for a sorting conveyor. Projected members of slats forming the sorting conveyor are made of ferromagnetic substance such as iron alloy. Those projected members are guided by a guide rail which is installed on the rear side of the conveyor. The guide rail is made up of a main rail and a branch rail. The side wall of the branch rail is partially omitted near at the inlet of the branching portion of the guide rail where the branch rail branches from the main rail, and instead an upper side wall and a lower side wall are formed there by an electromagnet and a permanent magnet, respectively. When the electromagnet is energized, each projected member is attracted towards the upper side wall, and is then allowed to move along the lower side wall, thus being led into the branch rail. Thus, the articles on the conveyor are suitably sorted while being conveyed to the selected branch conveying path.

22 Claims, 24 Drawing Sheets

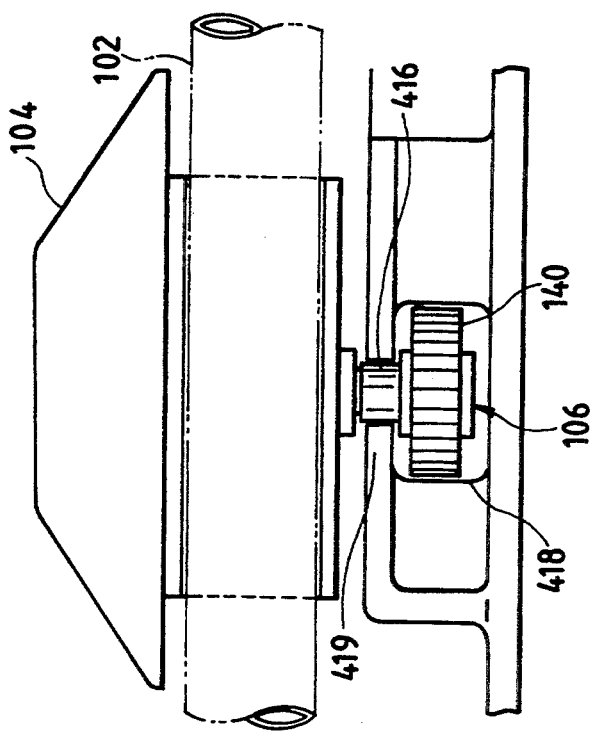
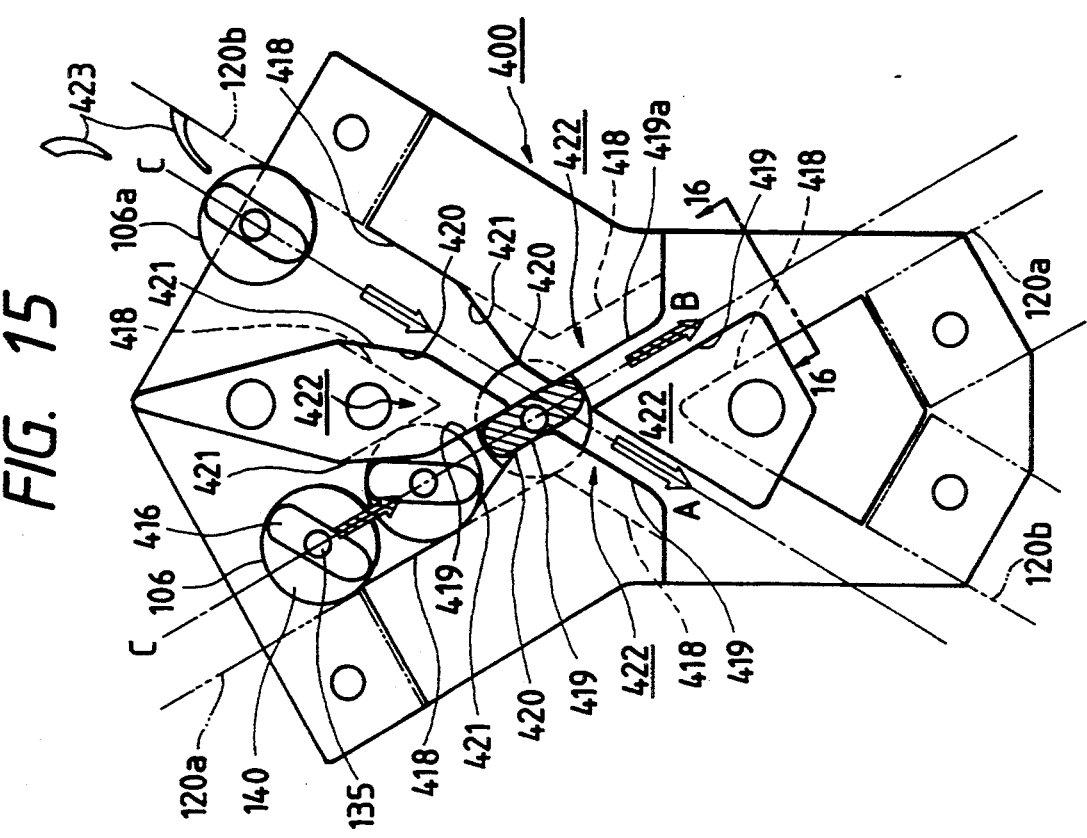

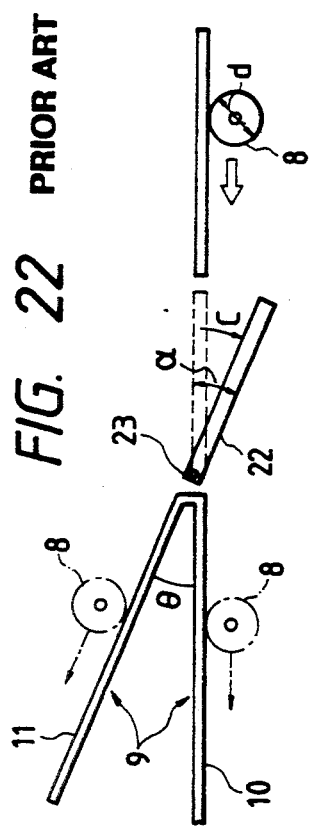
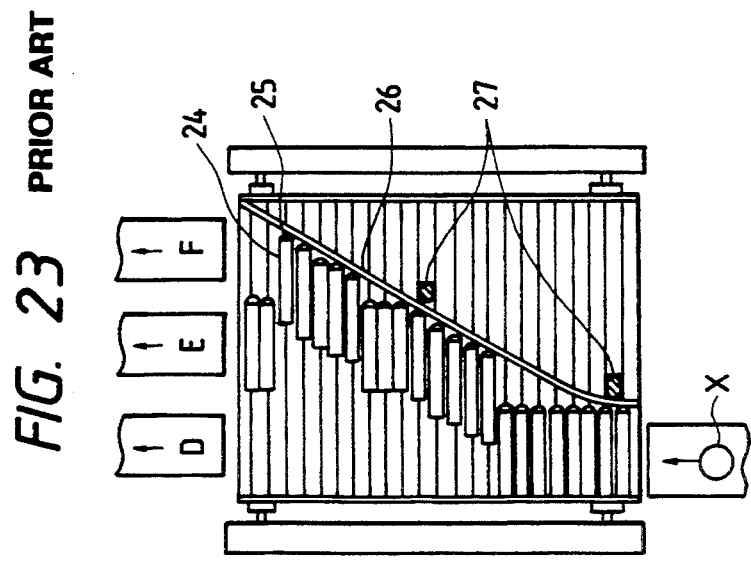
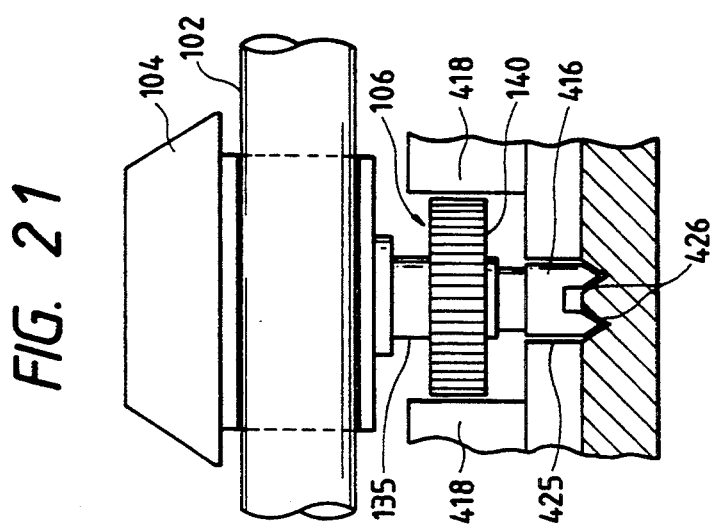

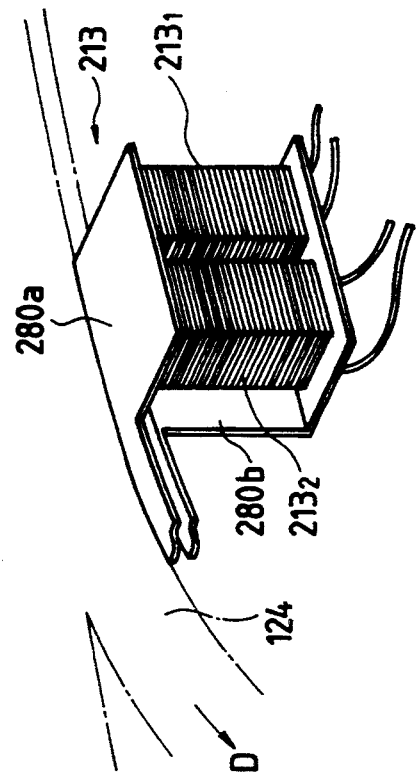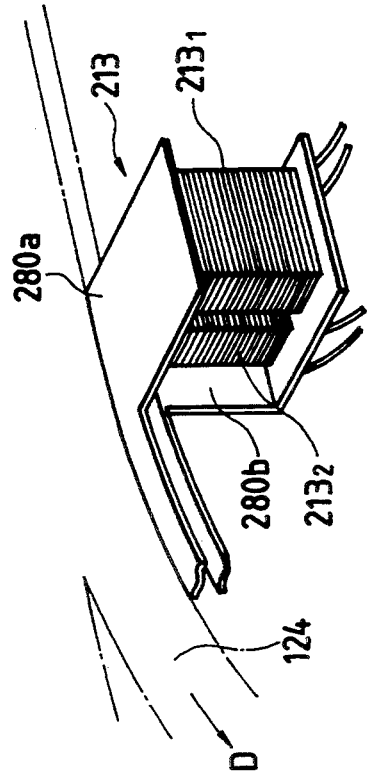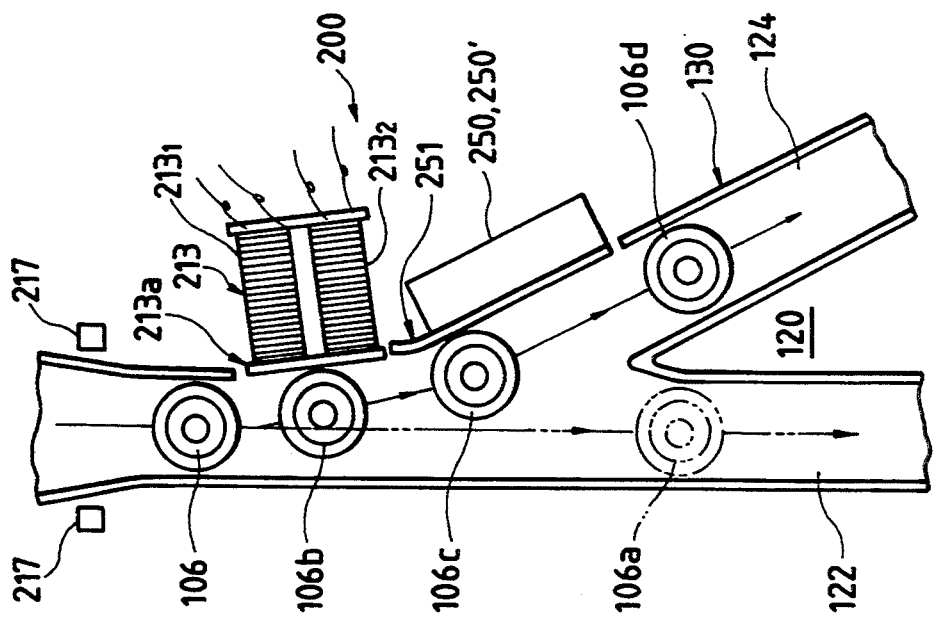

SORTING APPARATUS

BACKGROUND OF THE INVENTION

This invention relates to classifying or sorting devices, and more particularly to a slat conveyor type sorting device in which an article sorting operation is carried out with a slat conveyor which is suitable for conveying articles different in configuration and in size.

There are available a variety of sorting devices in the art; for instance, a sorting device of the wheel float type, a sorting device of the push-out type, a sorting device of the tilt type, a sorting device using obliquely driven belts, and a sorting device using moving shoes on a slat conveyor. The slat conveyor is suitable for conveying articles different in configuration or in size. In the case of the slat conveyor, its sorting device employs moving shoes which are moved along the slats forming the conveying surface (i.e., in a direction perpendicular to the direction of conveyance of the conveyor).

Such a sorting device has been disclosed, for instance, by Japanese Patent Application Publication No. 10971/1985 or U.S. Pat. No. 4,738,347. The fundamental arrangement of the sorting device incorporated in the slat conveyor is as follows: Each slat has a moving shoe which is slidable longitudinally. The moving shoe is designed as shown in FIG. 22. That is, a projected member 8 extended downwardly from each of the slats (which may be a pin extended downwardly therefrom or a member having a roller) is guided by a main rail 10 or a branch rail 11 of a guide rail 9 installed below the slats. The projected member 8 is moved longitudinally of the slat being guided by the branch rail 11 which is extended obliquely on one side of the conveyor. A conveying-direction change-over device is provided at a predetermined sorting position, and its change-over member, namely, a change-over lever 22 is swung clockwise (in the direction of the arrow C) about a fulcrum 23, as a result of which the projected member moving in a predetermined direction (in the direction of the arrow) is caused to move towards the branch rail 11. In this operation, an article which has reached the sorting position is moved laterally of the conveyor (i.e., in the direction of the branch rail) by the shoe, thus being classified or sorted.

In addition, a sorting device with moving shoes, which has a conveying direction change-over mechanism utilizing a magnetic attraction force, is known in the art. Such a change-over mechanism disclosed, for instance, by Japanese Patent Application Publication No. 12982/1977 is as shown in FIG. 23. That is, permanent magnets 25 are fixedly secured to slide members 24, respectively. Electromagnets 27 arranged at the introducing end and conveying path change-over position of a magnetic guide 26 are so energized as to be equal in polarity to the permanent magnets 25, so that the slide members 24 with the magnetic elements are spaced from the magnetic guide 26 by the force of repulsion, thereby to form an article conveying path, so that an article X is conveyed to the desired one of the branch conveying paths D, E and F.

As is apparent from the above description, in the conventional change-over mechanism with the change-over lever, it is necessary to increase the length of the change-over lever 22 in proportion to the diameter (d) of the projected member 8. In addition, when the opening angle $\theta$ between the main rail 10 and the branch rail 11 is increased, it is also necessary to increase the opening angle $\alpha$ of the change-over lever 22, because it must be substantially equal to the opening angle $\theta$. When the length of the change-over lever 22 is increased as was described above, then the rotational moment of the change-over lever 22 is increased, and accordingly it is necessary to increase the force of driving the change-over lever 22 as much. In addition, if the opening angle $\alpha$ of the change-over lever 22 is increased, then the amount of swing of the lever 22 is increased. This means that it takes a relatively long time to accomplish the predetermined operation.

In a case where the conveyor driving speed is increased, this difficulty may be eliminated by increasing the speed of operation of a drive system for the change-over lever 22, such as an electromagnetic valve or an air cylinder. However, the method is disadvantageous in the following points: As the drive system is improved in performance, the sorting conveyor is increased in size, or in manufacturing cost. Furthermore, as the length of the change-over lever 22 is increased, the speed of movement of the change-over lever 22, particularly at its end, is increased in proportion to the speed of rotation, as a result of which the lever is greatly shocked when stopped. Hence, in addition to the change-over lever itself, the members around it must be mechanically reinforced.

Therefore, if, when it is intended to increase the speed of operation of the change-over lever 22, the opening angle $\alpha$ is decreased to reduce the period of time required for completion of the predetermined operation, then it is not suitable for the case where the projected member 8 is large in diameter and the angle $\theta$ of the branch rail 11 is large.

The mechanism which utilizes the magnetic force of attraction to change the conveying path, as disclosed by the aforementioned Japanese Patent Application Publication 12982/1977, is high in manufacturing cost, because the permanent magnet 25 must be coupled to each of the number of slide members 24 forming the conveying path.

The conveying path in the branching direction is formed by attracting the slide members having the permanent magnets towards the magnetic guide 26. Therefore, the magnetic guide 26 should be extended over the entire length of the conveying path in the branching direction, which increases the manufacturing cost as much.

Furthermore, since the conveying path in the branching direction is formed by attracting the slide members towards the magnetic guide 26 as was described above, when it is required to perform a high speed conveyance by moving the slide members 24 at high speed, or when the article X on the slide members 24 is heavy, it is necessary to increase the magnetic force of attraction between the permanent magnets of the slide members and the magnetic guide accordingly. For this purpose, magnets or magnetic substances high in magnetic characteristic must be used, which also increases the manufacturing cost.

On the other hand, in the case where the slide members and the magnetic guide are high in magnetic characteristic, the electromagnets must be accordingly high in magnetic performance which are adapted to produce a force of repulsion to space the slide members from the magnetic guide in changing the conveying path. Accordingly, the electromagnets employed are unavoidably bulky.

Also, the conventional slat conveyor type sorting device using a moving shoe and a projected member is provided with a cross section portion where two guide rails forming respective guide paths cross each other in order to allow the moving shoe or projected member to go obliquely over the entire width of the conveying surface rightward or leftward selectively.

Japanese Patent Application Publication No. 11488/1984 discloses a change-over member used in such cross-section portion as shown in FIG. 26. Pawl-shaped end parts 39a and 39b are pivotally coupled to the end portions (closer to the intersection) of the upstream parts of the guide rails 34a and 34b, respectively. A selected one of the right and left end parts 39a and 39b is swung about the respective fulcrum 40, to switch the conveying paths extended to the downstream parts of the guide rails.

In addition, a change-over mechanism as shown in FIGS. 24 and 25 has also been disclosed by the aforementioned Japanese Patent application Publication No. 11488/1984. In the mechanism, each projected member 32 is made up of a throttle epicyclic wheel 41, and a pair of rollers 42 arranged on both side of the epicyclic wheel 41. The projected member 32, being guided by movable boards 43 arranged on the rear side of the conveying surface along both right and left edges, is moved along guide rails 34 in the direction of the arrow which are arranged as shown in FIGS. 24 and 25. Each of the guide rails is partially omitted a length shorter than the distance between the two rollers 42 but larger than the diameter of the epicyclic wheel 41; that is, it has a space 38 corresponding to the length. Therefore, the projected member 32 is moved to the following (downstream) guide rail 34 while passing through the space 38.

However, the above-described change-over mechanism suffers from various disadvantages.

That is, in the mechanism, as shown typically in FIG. 26, the change-over members 39a and 39b are arranged in the cross section portion, so that the guide rails are switched mechanically so as to allow the projected member to move to the following guide rail. Therefore, it is necessary to operate the change-over member 39 whenever it is required to switch the conveying paths. Hence, the mechanism is relatively low in durability, and produces noises whenever operated, thus adversely affecting the working environment.

The change-over member 39 is made up of a pair of end parts 39a and 39b as was described above. Hence, in switching the guide rails, it is essential to control the timing of operating (swinging) the end parts 39a and 39b with high accuracy. Accordingly, the mechanism is unavoidably intricate in arrangement. In particular, in order to switch the guide rails at high speed, it is necessary to increase the mechanical strength of the drive system of the change-over member 39, and to operate the control system with higher accuracy. This means an increase in manufacturing cost or in running cost.

In addition, it is necessary to provide the change-over member 39 at each of the guide rail cross sections, and therefore, the resultant sorting device is increased in manufacturing cost as much.

On the other hand, the change-over mechanism as shown in FIGS. 24 and 25, having no mechanical change-over member as shown in FIG. 26, is free from the above-described difficulties that it is low in durability, produces noises, or it is high in manufacturing cost or running cost. However, it is still disadvantageous in the following point: That is, if the space 38 is not accurately aligned with the adjacent guide rails, then the front end of the projected member collides with the junction 44 of the guide rails, so that the projected member is not smoothly moved over to the following guide rail, which may result in the occurrence of a trouble with the sorting device. This is a serious problem particularly when the conveying speed is high.

Accordingly, an object of this invention is to eliminate the above-described difficulties accompanying a conventional sorting device. More specifically, an object of the invention is to provide a sorting device which is able to classify or sort articles on the conveying surface accurately and quickly, and which produces no noises in changing the conveying path, and in which the change-over mechanism is simple in arrangement and low in manufacturing cost. Another object of this invention is to provide a sorting conveyor change-over device which is low in manufacturing cost and simple in arrangement, and which is suitable for a high speed conveying operation, thus permitting articles to be classified or sorted positively and quickly.

SUMMARY OF THE INVENTION

In order to attain the above-noted and other objects, the present invention provides A change-over device adapted to be used in a slat conveyor type sorting apparatus including a plurality of slats arranged side by side to form a conveying surface on which articles are loaded, drive means for moving the slats in a direction substantially perpendicular to a longitudinal direction of the slats to convey the articles together with the slats and moving shoes mounted on corresponding slats and movable in the longitudinal direction, the change-over device comprising: a projected member protruded from each of the slats below the conveying surface; first, second and third guide rails installed below and substantially parallel to the conveying surface for guiding the projected member together with the moving shoe when the slats are moved by the drive means, wherein the second and third guide rails branch from the first guide rail so that the projected member moving along the first guide rail is selectively introduced into one of the second and third guide rails; and a magnet means provided on the second guide rail for operatively attracting the projected member toward the second guide rail.

The change-over device may be used as a shoe shifting device.

The present invention further provides a change-over device adapted to be used in a slat conveyor type sorting apparatus including a plurality of slats arranged side by side to form a conveying surface on which articles are loaded, drive means for moving the slats in a direction substantially perpendicular to a longitudinal direction of the slats to convey the articles together with the slats and moving shoes mounted on corresponding slats and movable in the longitudinal direction, the change-over device comprising: a projected member protruded from each of the slats below the conveying surface; first, second and third guide rails installed below and substantially parallel to the conveying surface for guiding the projected member together with the moving shoe when the slats are moved by the drive means; a branch section where the second and third guide rails branch from the first guide rail so that the projected member moving along the first guide rail is selectively introduced into one of the second and third guide rails; and a magnet means for operatively moving the projected member toward the second guide rail, the magnet means including a secondary conductor made of ferromagnetic material and fixed on the projected member and a linear motor disposed below the branch section so as to operatively apply an impellent force to the secondary conductor.

The present invention further provides a change-over device adapted to be used in a slat conveyor type sorting apparatus including a plurality of slats arranged side by side to form a conveying surface on which articles are loaded, drive means for moving the slats in a direction substantially perpendicular to a longitudinal direction of the slats to convey the articles together with the slats and moving shoes mounted on corresponding slats and movable in the longitudinal direction, the change-over device comprising:

a projected member having a support shaft protruded from each of the slats below the conveying surface and a rotary member rotatably mounted on the support shaft;

first, second and third guide rails installed below and substantially parallel to the conveying surface for guiding the rotary member together with the moving shoe when the slats are moved by the drive means, wherein the second and third guide rails branch from the first guide rail so that the rotary member moving along the first guide rail is selectively introduced into one of the second and third guide rails; and a magnet means provided on the second guide rail for operatively attracting the rotary member toward the second guide rail, the magnet means including an electromagnet located immediately downstream of the first guide rail, a pair of yoke members connected to the electromagnet and extending along the second guide rail to form a smooth and continuous guide surface on which the rotary member is guided when the electromagnet is energized, and a plurality of magnets interposed and held between the yoke and disposed downstream of the electromagnet and along the guide surface.

The present invention further provides a change-over device adapted to be used in a slat conveyor type sorting apparatus including a plurality of slats arranged side by side to form a conveying surface on which articles are loaded, drive means for moving the slats in a direction substantially perpendicular to a longitudinal direction of the slats to convey the articles together with the slats and moving shoes mounted on corresponding slats and movable in the longitudinal direction, the change-over device comprising: a projected member protruded from each of the slats below the conveying surface; a main rail installed below and substantially parallel to the conveying surface for guiding the projected member therealong; first and second branch rails branching from the main rail at different positions, and both for guiding the projecting member and moving corresponding moving shoe so that an article is forced by the moving shoe from the conveying surface to a common downstream conveyor; and introducing means for selectively introducing the projected member from the first guide rail to one of the first and second branch guide rails.

The present invention further provides a slat conveyor type sorting apparatus, comprising: a plurality of slats arranged side by side to form an endless conveyor having right hand end and left hand end; drive means for moving the endless conveyor; moving shoes mounted on corresponding slats and movable from one of the right and left hand ends to the other; wherein the endless conveyor includes: a conveying region in which articles are loaded from an upstream conveyor on a conveying surface and sorted therefrom while being conveyed, and a returning region located opposite to the conveying region, the conveying region having a first sorting area in which a corresponding article is sorted from the endless conveyor to a first downstream conveyor extending from the left hand end by moving the moving shoes from the right hand end to the left hand end, and a second sorting area in which a corresponding article is sorted from the endless conveyor to a second downstream conveyor extending from the right hand end by moving the moving shoes from the left hand end to the right hand end; and wherein the slat type conveyor further comprises: a shoe shifting device located in the returning region for positioning respective moving shoes, which are to be used for sorting an article to be loaded from the upstream conveyor to the endless conveyor, at one of the left hand side and the right hand side in accordance with a sorting data of the article.

The shoe shifting device preferably comprises: a projected member protruded from each of the slats below the conveying surface; first, second and third guide rails installed below and substantially parallel to the conveying surface for guiding the projected member together with the moving shoe when the slats are moved by the drive means, wherein the second and third guide rails branch from the first guide rail so that the projected member moving along the first guide rail is selectively introduced into one of the second and third guide rails; and a magnet means provided on the second guide rail for operatively attracting the projected member toward the second guide rail.

The present invention further provides a classifying device for a conveyor made up of a plurality of slats arranged side by side for conveying articles, which comprises moving means for moving articles loaded on the conveyor longitudinally of the slats at an article classifying position, by guiding projected members protruded from the moving means along a pair of guide rails which are installed on the rear side of the article conveying surface of the conveyor in such a manner that the pair of guide rails are extended obliquely over the entire width of the article conveying conveyor and cross each other, wherein each projected member comprises: a bearing rotatably mounted on a supporting shaft protruded on the side of the guide rails; and a rotary shoe including a major diameter portion and a minor diameter portion, and, in the cross region of the guide rails, a bearing guide for guiding the bearing of each projected member, and a rotary shoe guide are provided for each of the pair of guide rails in such a manner that the bearing guide and the rotary shoe guide are laid on one and the same central line, the rotary shoe guide comprising: a rotary shoe introducing section for regulating the direction of the major diameter portion of each rotary shoe; and a rotary shoe passing section which guides the rotary shoes, having a passageway which is wide enough for the minor diameter portion of each rotary shoe to pass through.

The present invention further provides a classifying device for a conveyor made up of a plurality of slats arranged side by side for conveying articles, which comprises moving means for moving articles loaded on the conveyor longitudinally of the slats at an article classifying position, by guiding projected members protruded from the moving means along a pair of guide rails which are installed on the rear side of the article conveying surface of the conveyor in such a manner that the pair of guide rails are extended obliquely over the entire width of the article conveying conveyor and cross each other, wherein each projected member comprises: a bearing mounted on a supporting shaft protruded on the side of the guide rails; and a rotary shoe which is rotatably mounted below the bearing, having at least one edge portion at the end, and, in the cross region of the guide rails, a bearing guide for guiding the bearing of each projected member, and a rotary shoe guide are provided for each of the rail guides in such a manner that the bearing guide and the rotary shoe guide are laid on one and the same central line, the rotary shoe guide comprising: a rotary shoe introducing section for regulating the longitudinal direction of the edge portion of each rotary shoe; and rotary shoe guide walls and a rotary shoe guide groove for guiding the edge portion of each rotary shoe.

BRIEF DESCRIPTION OF THE DRAWINGS

In the accompanying drawings:

FIG. 15 is a top view showing essential components of an example of a guide rail cross section in the sorting according the invention;

FIG. 16 is a fragmental view taken in the direction of the arrow substantially along line 16—16 in FIG. 15, showing the guide rail cross section;

FIG. 21 is a fragmental view taken in the direction of the arrow substantially along line 21—21 in FIG. 20, showing the guide rail cross section;

FIG. 22 is an explanatory diagram for a description of the operation of a lever change-over mechanism in a conventional change-over lever type sorting machine;

FIG. 23 is an explanatory diagram showing one example of a conventional sorting machine operating on a magnetic action;

FIG. 37 is a top of showing essential components of another example of the change-over mechanism in the sorting conveyor according to the present invention, in which an upstream electromagnet is made up of a plurality of electromagnet elements;

FIGS. 38A, 38B, 39, 40A and 40B show modifications for an electromagnet used in the change-over mechanism according to the present invention;

DETAILED DESCRIPTION OF THE PREFERRED EMBODIMENTS

Preferred embodiments of this invention will be described with reference to the accompanying drawings.

A basic construction of a slat conveyor type sorting device according to the present invention will be described hereunder.

Figure 1:
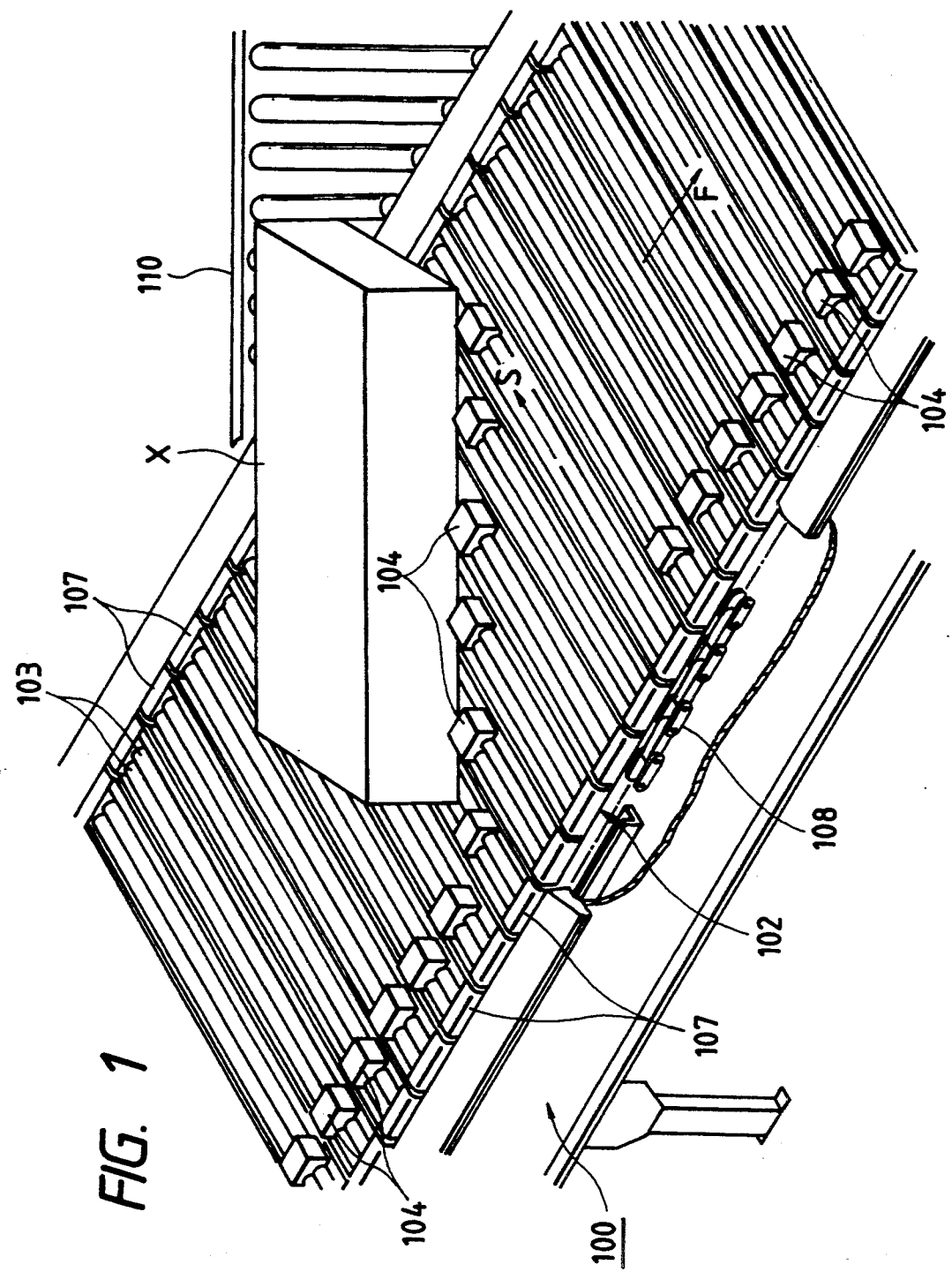
FIG. 1 is a perspective view of a sorting conveyor of slat shoe type according to an embodiment of the present invention.

A slat conveyor 100; as shown in FIG. 1, is made up of a plurality of slats 102 arranged side by side so that articles X are placed on them. Drive chains 108 fixedly coupled to the slats 102 at both ends are driven so that the article X is conveyed in a predetermined direction (i.e., in the direction of the arrow F) together with the slats 102.

Articles X are sorted as follows: That is, moving shoes 104 on the slats 102 are moved in a direction (as indicated by the arrow S) perpendicular to the direction of the arrow F by a change-over mechanism (described later) to form a path towards a branch conveying path 110; that is, the article X is moved along the path thus formed into the branch conveying path 110. For example, as shown in FIG. 2, an article X is conveyed from an upstream conveyor A to a sorting conveyor 100, and it is sorted while being on the conveying surface of the sorting conveyor 100 by the moving shoe 104, and delivered to a selected one of the conveyors B and C located downstream of the sorting conveyor and forming respective branch conveying paths 110.

Figure 2:
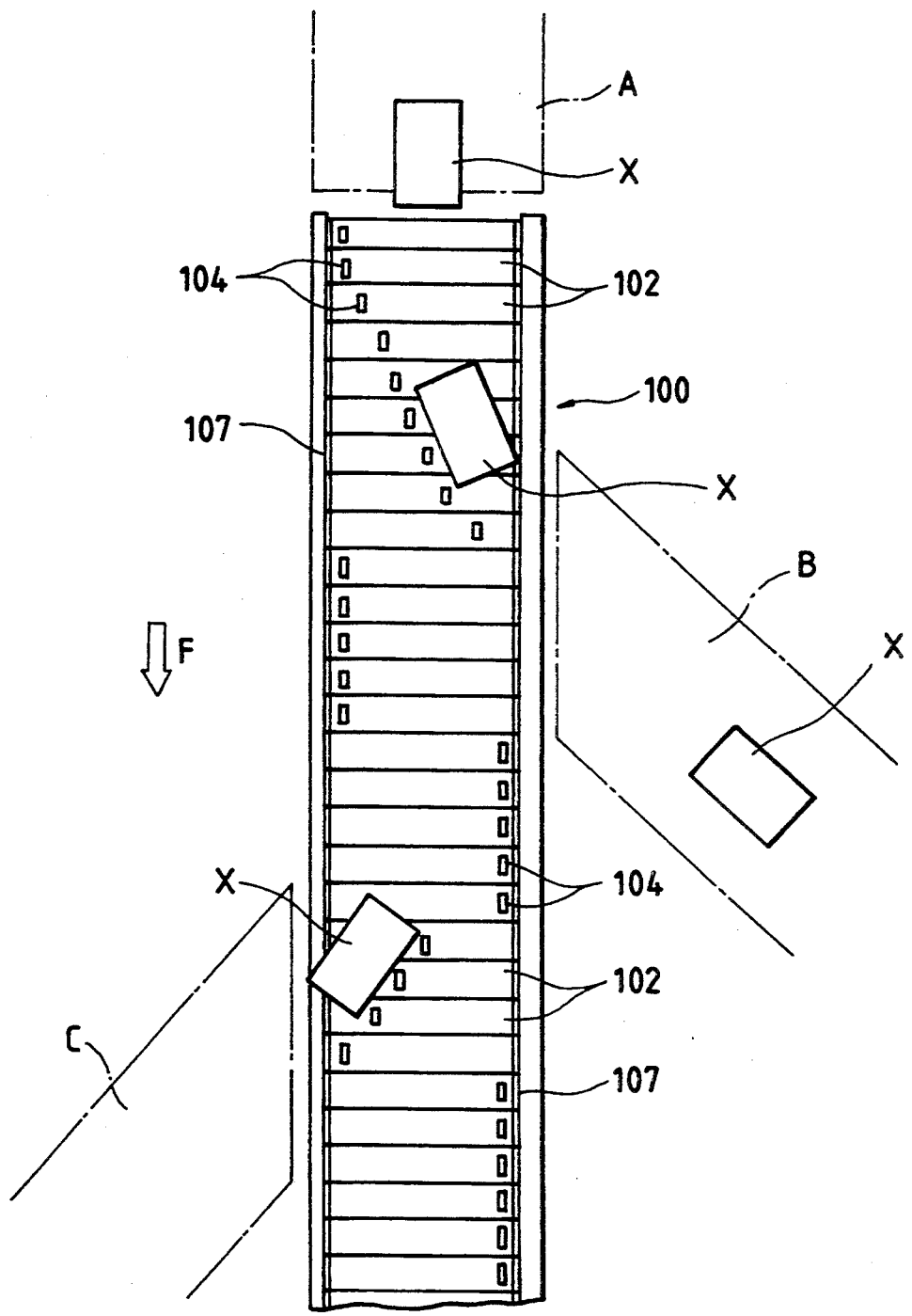
FIG. 2 is a top view showing the conveyor shown in FIG. 1.
Figure 3:
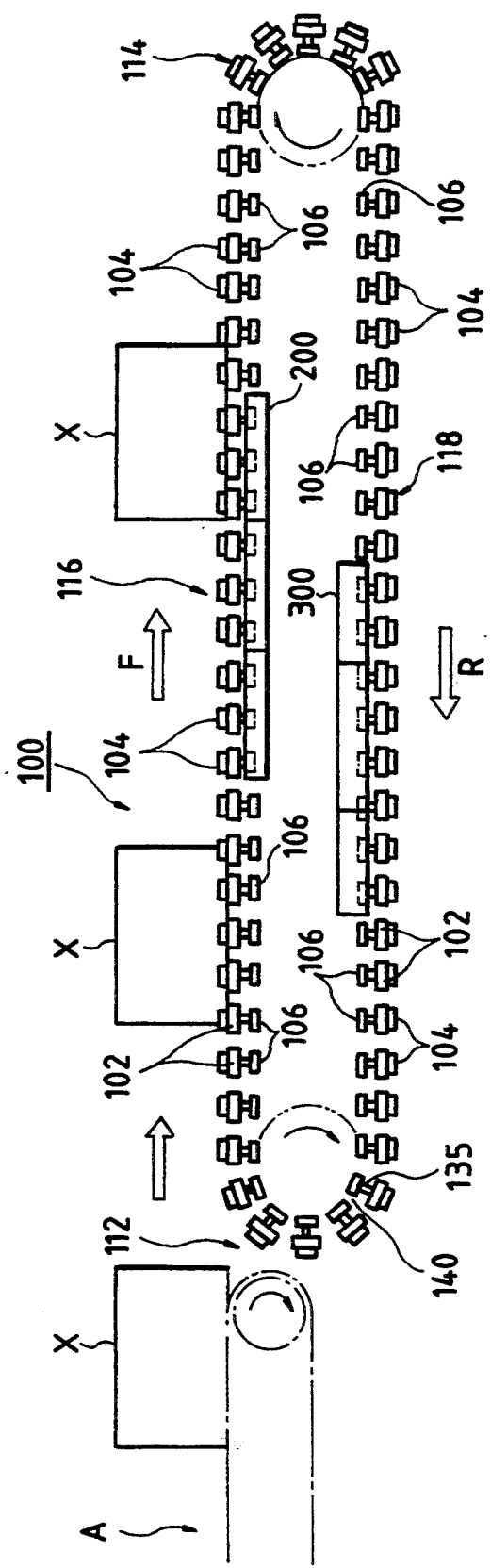
FIG. 3 is a side view showing the conveyor shown in FIG. 1.

FIG. 3 is a side view of the sorting conveyor shown in FIG. 2. The sorting conveyor 100 includes: a conveying region 116 in which an article X is loaded from the conveyor A onto the sorting conveyor 100 and it is classified or sorted while being moved in the direction of the arrow F and delivered to the downstream conveyor B or C; and a returning region 118 which is located on the side which is opposite to the side where the conveying surface is provided, and is moved in the direction of the arrow R.

Each of the slats 102 is designed as follows: It has end blocks 107 at both ends, which are suitably coupled to extension pins of the drive chains 108 on both sides of the conveyor. More specifically, the two end blocks 107 are connected through two slat bars 103 to each other, which form a load conveying surface of the slat conveyor 100. The aforementioned moving shoe 104 is mounted on the slat bars 103 in such a manner that it is movable on the slat bars 6 in a direction perpendicular to the load conveying direction (i.e., in the direction of the arrow F). Each moving shoe 104, as shown in FIG. 3, includes a projected member 106 comprising a guided member 140 (i.e. a roller, wheel, bearing or the like) mounted on a shaft 135 extended downwardly from the slat 2. A change-over mechanism 200 (described later) is operated to guide the projected member 106 to a main rail 122 or a branch rail 124 of a guide rail 120 installed below the slats.

Figure 4:
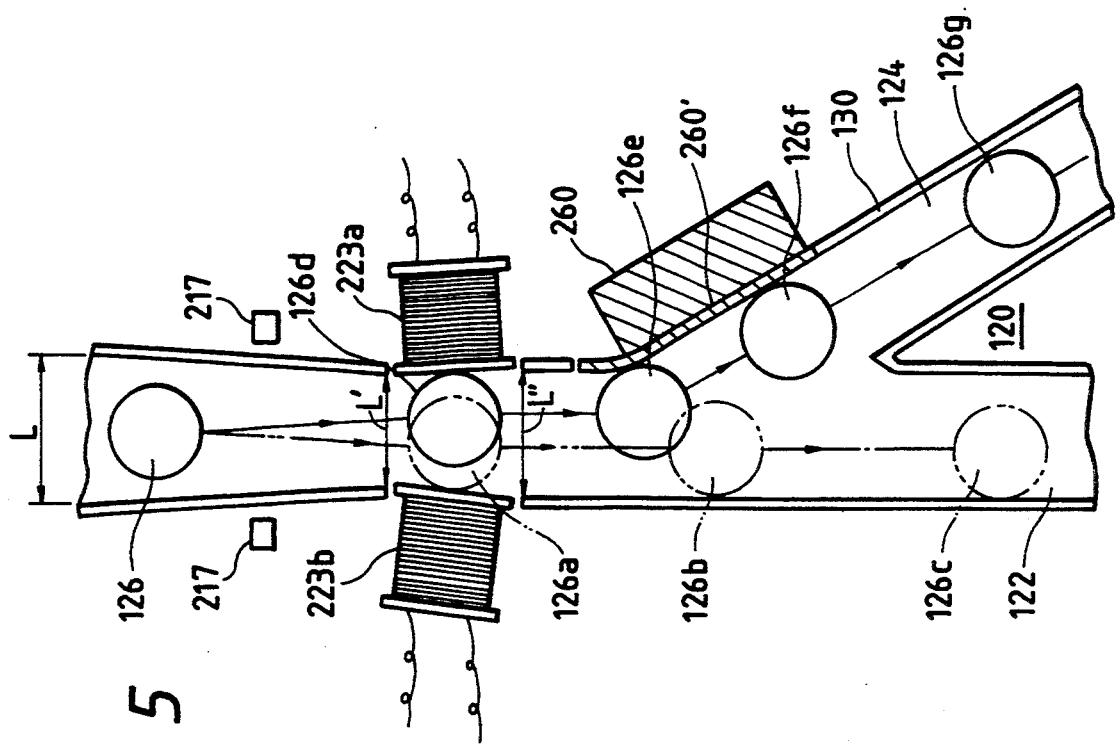
FIG. 4 is a top view showing essential components of one example of a change-over mechanism in the sorting conveyor according to the invention.

FIG. 4 is a top view showing essential components of a branching section of a conveying path, for a description of one example of the change-over mechanism according to the invention for the conveying path.

The guide rail 120, as was described above, comprises: the main rail 122 for conveying an article X straightly (i.e., in a main direction) on the conveyor; and the branch rail 124 for conveying an article X in a sorting direction (i.e., in a branch direction). The branch rail 124 has a side wall 130 which is partially omitted near the inlet of a branching portion of the guide rail where the branch rail 124 branches from the main rail 122, and instead an upper side wall 213a and a lower side wall 251 are formed there by an electromagnet 213 and a permanent magnet 250 or an electromagnet 250', respectively, in such a manner that those upper and lower side walls 213a and 251 are aligned with the side wall 130.

Sensors 217 are arranged beside the guide rail 120, upstream of the branching portion, to detect the passage of each projected member 106 moving along the guide rail 120, to provide a passage detection signal. The passage detection signal and sorting data (not shown) are suitably utilized to control the energization of the electromagnet 213.

The projected member 106 of each moving shoe 104 includes a roller or bearing 140. In FIG. 4, the projected member 106 is moved downwardly along the guide rail during conveyance.

When no sorting operation is carried out; that is, in the case where the articles on the conveyor are moved straightly, the projected member is moved straightly downwardly in FIG. 4, thus moving along the main rail 120 (as a projected member 106a in FIG. 1). In this operation, the electromagnet 213 is not energized; that is, the projected member 106, being not attracted by the electromagnet 213, is moved straightly into the main rail 122.

On the other hand, in a sorting operation, the electromagnet is energized so that the projected member 106 is attracted (moved) towards the upper side wall 213a (as a projected member 106b in FIG. 4). Thereafter, it is allowed to moved along the lower side wall 251 formed by the permanent magnet 250 or electromagnet. 250' by the virtue of magnetic attraction thereof, so that it is led into the branch rail 124. In the case where the lower side wall 251 is formed by the electromagnet 250', the latter 250' is energized at the same time as the electromagnet 213.

Figure 5:
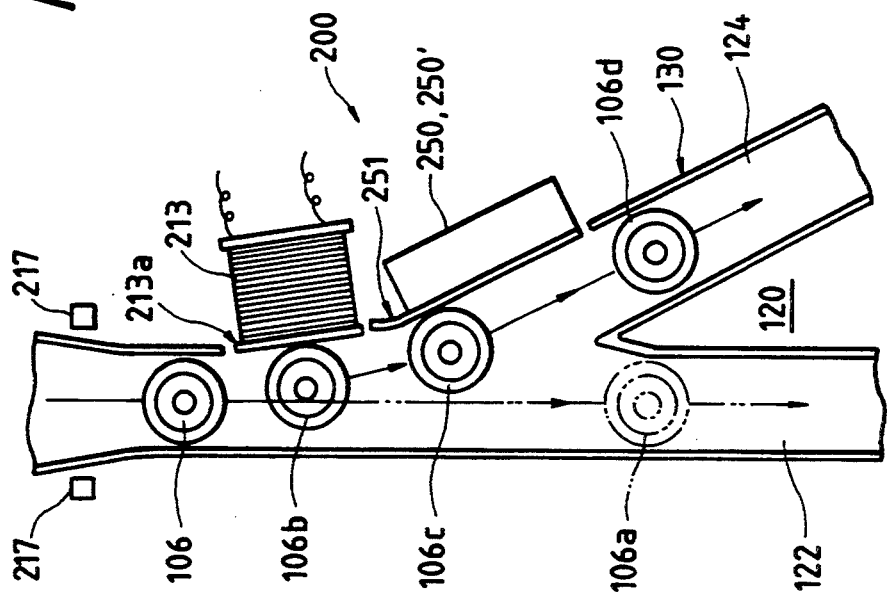
FIG. 5 is a top view showing essential components of another example of the change-over mechanism in the sorting conveyor according to the invention.

FIG. 5 shows another example of the conveying path change-over mechanism according to the invention.

Similarly as in the case of the change-over mechanism shown in FIG. 4, a guide rail 120 is made up of a main rail 122 and a branch rail 124. However, in the second example, the guide rail 120 is designed as follows: The width of the rail is smaller towards the portion of the guide rail (hereinafter referred to as "a first portion", when applicable) which is located upstream of the branching portion of the guide rail 120 where the branch rail 124 branches from the main rail 122, being decreased substantially equal to the outer diameter of projected members 126, and in the following portion (hereinafter referred to as "a second portion", when applicable) larger towards the downstream end of the guide rail 120. That is, the guide rail 120 is so designed that the rail width meets L'<L, and L'<L" as shown in FIG. 5. A pair of electromagnets 223a and 223b are provided on both sides of the second portion of the guide rail 120 where the rail width is larger towards the downstream end of the guide rail as was described above. The arrangement of the electromagnets 223a and 223b are not limited to that which is described above. For instance, the electromagnet may be set as follows: The side walls of the guide rail 120 are partially omitted at the aforementioned second portion where the rail width is gradually increased, and the pair of electromagnets 223a and 223b are set to reform the parts of the side walls thus omitted.

As was described above, the rail width is gradually decreased substantially equal to the outside diameter of the projected members 126. Therefore, on the border line between the first portion of the guide rail 120 where the rail width is gradually decreased as described above, and the second portion following the first portion, the distance of the projected member 126 from the electromagnets 223a and 223b is decreased, and the magnetic force of attraction applied to the projected member 126 is increased as much, so that the latter 126 is positively led to the branch rail 124 as required.

In addition, in the second example of the change-over mechanism, a part of the side wall 130, near the branching portion of the guide rail 120 where the branch rail 124 branches from the main rail 122, is made of a magnetic substance 260' which is magnetized by a permanent magnet 260. It is not always necessary for the permanent magnet 260 to cover the entire length of the magnetic substance. That is, it may be so positioned as to cover only a part of the magnetic substance which is closer to the branching portion of the guide rail. In FIG. 5, the permanent magnet 260 is rectangular in section; however, the invention is not limited thereto or thereby; that is, it is not limited in configuration; and all that is necessary for the permanent magnet is able to magnetize the magnetic substance 260'.

Sensors 217 for detecting the passage of each projected member 126 are provided upstream of the pair of electromagnets 223a and 223b, to output a detection signal. The detection signal and sorting data are utilized to control the energization of the electromagnets 223a and 223b.

The projected member 126 of each moving shoe 104 is made up of a roller or bearing, and it is moved downwardly, in FIG. 5, along the guide rail 120 during conveyance.

When no sorting operation is carried out; that is, articles on the conveyor are to be moved straightly, only the left electromagnet 223b is energized, so that the projected member 126 passing through the second portion of the guide rail where the rail width is gradually increased is attracted (moved) towards the electromagnet 223b (as a projected member 126a in FIG. 5). Thereafter, the projected member 126 is allowed to move along the left side wall of the guide rail (as a projected member 126b in FIG. 5), thus being led into the main rail 122 (as a projected member 126c). In order that the projected member 126 which has been attracted towards the electromagnet 223b may be more positively moved along the left side wall of the guide rail, the part of the side wall may be formed of a magnetic substance magnetized by a permanent.

On the other hand, in a sorting operation, only the right electromagnet 223a is energized, so that the projected member 126 is attracted (moved) towards the electromagnet 223a (as a projected member 126d. Thereafter, the projected member 126 is allowed to move along the part 260' of the side wall of the branch rail, which is made of a magnetic substance (as projected members 126e and 126f in FIG. 5), thus being led into the branch rail 124 (as a projected member 126g in FIG. 5).

As the projected members 126 are moved in the above-described manner, the moving shoes 104 are accordingly moved longitudinally of the slats. As a result, the article X on the conveyor is pushed in the direction of the arrow S in FIG. 1, thus being moved into the branch conveying path extended laterally of the conveyor. Thus, the article X has been classified.

Figure 6:
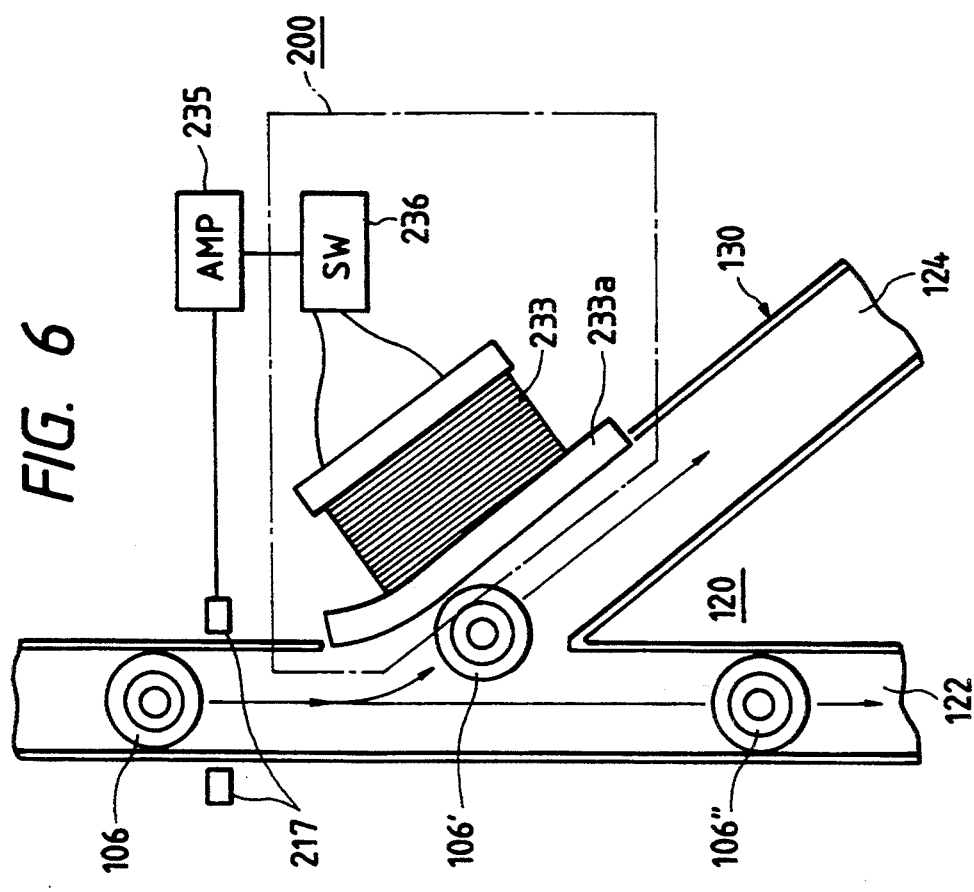
FIG. 6 is a top view showing essential components of yet another example of the change-over mechanism in the sorting conveyor according to the invention.

FIG. 6 shows yet another example of the conveying path change-over mechanism 200 according to the present invention. The change-over mechanism 200 includes an electromagnet 233 and a switch 236 for controlling the energization of the electromagnet 233, and is located in a branch section of the guide rail 120 where the branch rail 124 branches from the main rail 122. A side wall 130 of the branch rail 124 is partially omitted at an inlet portion of the branch rail 124, and a core 233a of the electromagnet 233 is located on that portion along the extension of the side wall 130 in place of the omitted side wall. Although the configuration of the core 233a is not limited as far as the core 233a forms a part of the side wall of the branch rail 124, it is preferable that the core 233a is slightly bent at its upper end portion so as to smoothly merge to the guide rail 120 in order to surely and smoothly guide the projected member 106 toward the branch rail 124 during the conveying path change-over operation.

Sensors 217 are located at upstream of the branch section of the guide rail 120 so as to detect the passing of the projected member 106 which moves along the guide rail 120. A detection signal fed out from the sensors 217 are amplified by the amplifier 235 and supplied to the switch 236. The switch 236 controls the current supply to the electromagnet 233 through the appropriate calculation based on the detection signal from the sensors 217 and the sorting data appropriately inputted.

The projected member 106 of the moving shoe 104 is made up of a roller or bearing and travels along the guide rail 120 downwardly of FIG. 6 during the conveyance of the object or article.

When the sorting operation is not performed (i.e. the article on the conveyor is merely conveyed straightly), the current is not supplied to the electromagnet 233 so that the projected member 106 is not attracted to the electromagnet 233 and is moved straightly and downwardly toward the main rail 122 as shown by the reference numeral 106''.

On the other hand, when the sorting operation is performed, by supplying the current to the electromagnet 233 the projected member 106 is attracted to the electromagnet 233 so as to be moved along the core 233a of the electromagnet 233, as a result of which the projected member is introduced into and guided along the branch rail 124.

Depending on the successive movement of the projecting members 106, the respective moving shoes 104 are moved longitudinally of the slats so that the article X on the conveyor is forced in a direction of arrow S in FIG. 1 toward a branch conveying path, thereby enabling the desired sorting operation.

Figure 7:
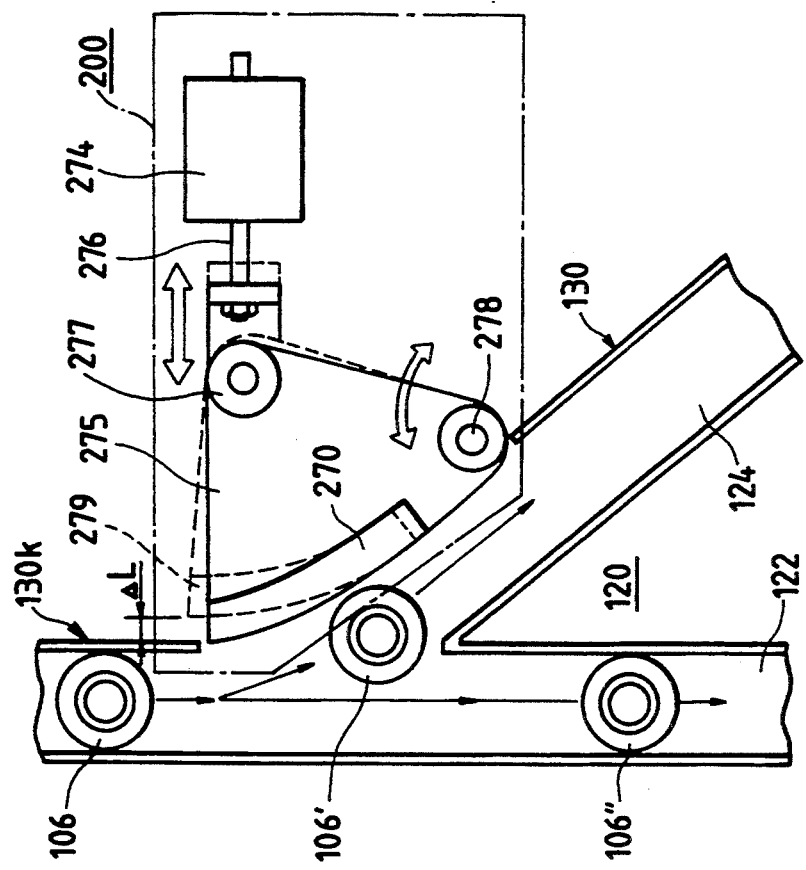
FIG. 7 is a top view showing essential components of still another example of the change-over mechanism in the sorting conveyor according to the invention.

FIG. 7 shows still another example of the conveying path change-over mechanism 200 according to the present invention. The change-over mechanism 200 includes a permanent magnet 270, an actuator 274 and a connecting member 275 connecting the permanent magnet 270 and the actuator 274 together. The connecting member 275 is substantially in the form of the fan having an acute portion and a fan center opposite from the acute portion. The substantially parallel-piped permanent magnet 270 is secured to a side of the fan-shaped connecting member 275 so as to extend along the acute portion and stand upright on the side. The fan censor is coupled to an output shaft 276 of the actuator 274 through a pin 277. One end of the acute portion of the connecting member is rotatably supported on the pin 278. The actuator 274 is comprised of an air-cylinder, solenoid valve or the like. The acute portions of the connecting member 275 and the permanent magnet 270 constitutes a part of the side wall of the branch rail 124 at the branch section of the guide rail 120.

The projected member 106 of the moving shoe 104 is made up of a roller or bearing which is made of ferromagnetic material such as iron alloy. The projected member 106 is moved downwardly of FIG. 7 during the conveyance.

When the sorting operation is not performed, i.e. the article on the conveyor is moved straightly, the output shaft 276 of the actuator 274 is retracted rightward so as to rotate the connecting member 275 about the pin 278 clockwise and retain the connecting member 15 in a position shown by a broken line in FIG. 7. In a state where the connecting member is retained in that position shown by the broken line, an end 279 of the permanent magnet 270 fixed along the acute portion of the connecting member 275 is spaced apart from the side wall 130k of the guide rail 120 with an amount of $\Delta L$. As a result, the projected member 106 formed of ferromagnetic material neither contacts with a side face of the permanent 270 nor approaches the permanent magnet 270 within the distance in which the magnetic force sufficiently affects on the projected member 106 during the movement thereof. Thus, the projected member 106 is prevented from being attracted by the magnetic force of the permanent magnet 270, and is moved straightly and downwardly toward the main guide rail 122 (as illustrated by the reference numeral 106'').

On the other hand, if the sorting operation is performed, the output shaft 276 of the actuator 274 is pushed out leftward so as to rotate the connecting member 275 about the pin 278 counterclockwise and locate the end 279 on the extension of the side wall 130k. Thus, the connecting member 275 and the permanent magnet 270 supplement the omitted portion of the side walls 130 to form a part of the side wall of the branch rail 124. Since the projected member 106 approaches the permanent magnet 270 and sufficiently receives the magnetic force thereof, the projected member 106 is laterally moved toward the side face of the permanent magnet 270, and introduced into and guided along the branch rail 124 as shown by reference numeral 106'.

In addition, the operation of the actuator 274 is controlled based on the sorting data and the detection signal sent from the sensor provided upstream of the branch section of the guide rail 120 for detecting the end portion of the projected member 106 moving together with the slat 102.

Depending on the successive movement of the projecting members 106, the respective moving shoes 104 are moved longitudinally of the slats so that the article X on the conveyor is forced in a direction of arrow S in FIG. 1 toward a branch conveying path, thereby enabling the desired sorting operation.

As noted above, in this embodiment, the conveying path change-over operation can be performed by moving the permanent magnet 270 fixed on the fan-shaped connecting member 275 with only $\Delta L$ amount.

Figure 8:
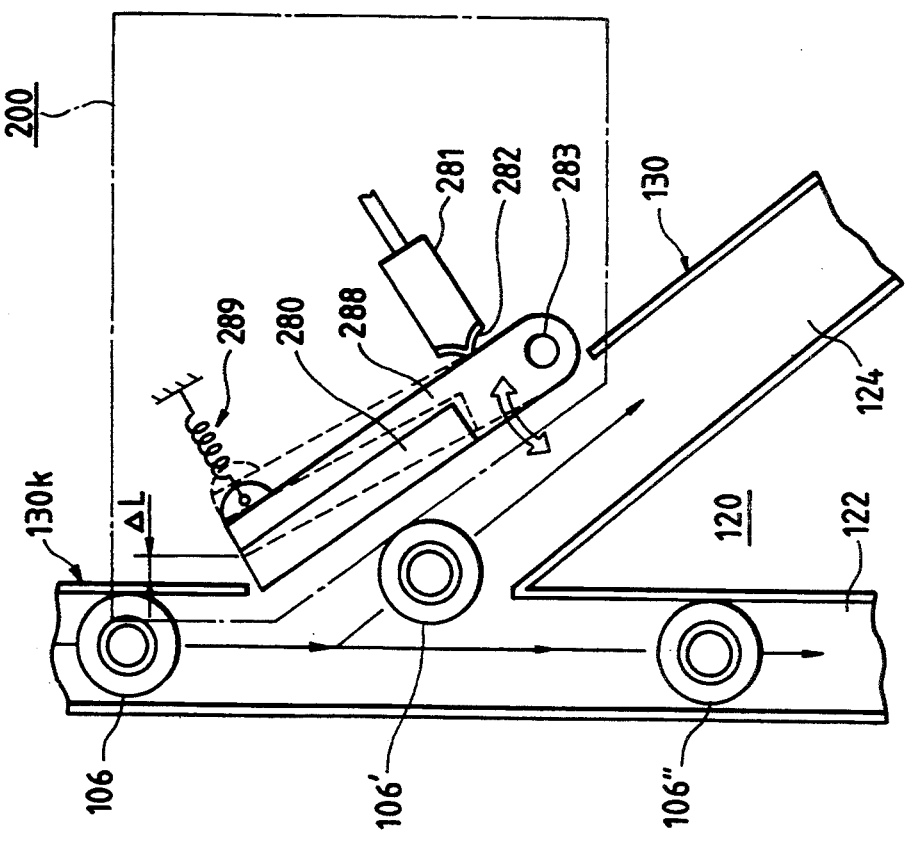
FIG. 8 is a top view showing essential components of further another example of the change-over mechanism in the sorting conveyor according to the invention.

In addition, as shown in FIG. 8, a plate-like member 288 corresponding in length to the omitted side wall may be used in place of the fan-shaped connecting member 275. The permanent magnet 280 is fixed on the plate-like member 288 so as to extend along a longer side thereof. The member 288 is rotatably supported on the pin 283 and biased by a tensile spring 289 rightward of FIG. 8. In the vicinity of the pin 283, an air-cylinder 281 having a diaphragm 283 is provided so that the strike of the air cylinder 281 can be reduced during the conveyance path change-over operation.

Figure 9:
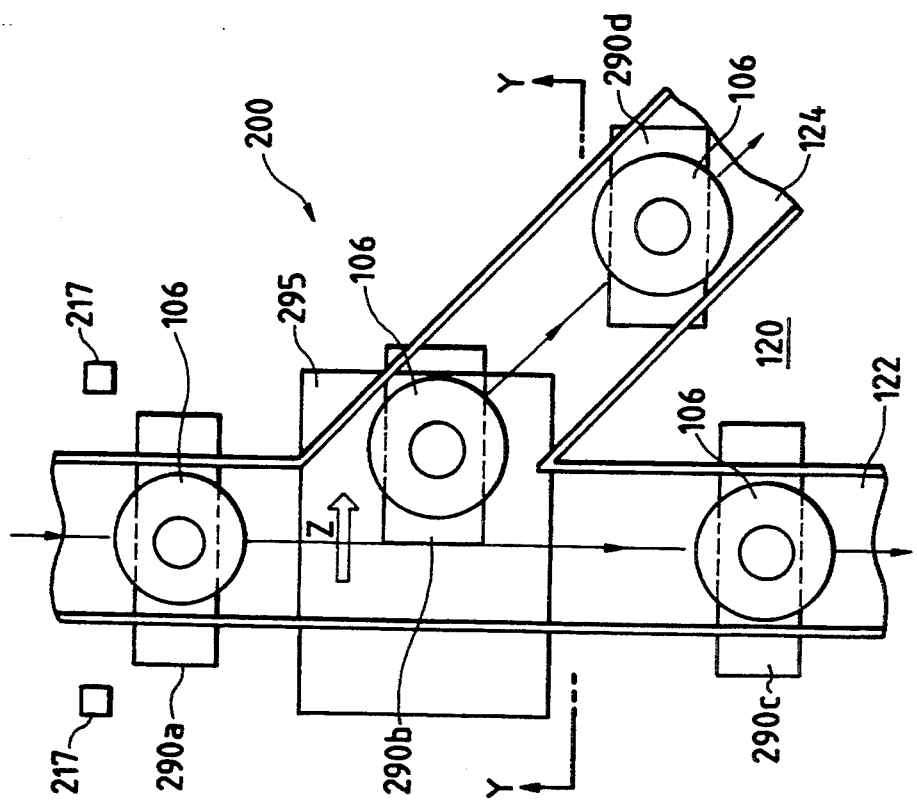
FIG. 9 is top view showing essential components of a still further example of the change-over mechanism in the sorting conveyor according to the invention.
Figure 10:
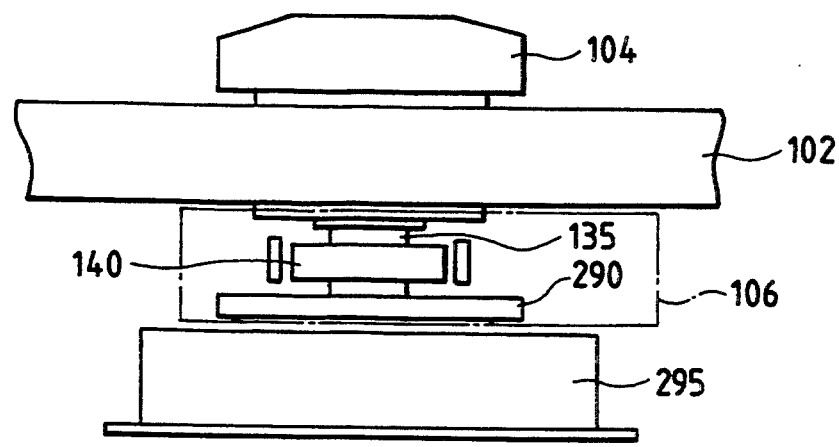
FIG. 10 is front view showing the essential components of the change-over mechanism shown in FIG. 9.

FIGS. 9 and 10 show a further example of the conveyance path change-over mechanism 200 according to the present invention. As shown in FIG. 10, the moving shoe 104 is provided with the projected member 106. The projected member 106 includes a guided member 140 made of a roller, bearing or the like which is mounted on a shaft 135 extending downward from the slat 102 as similarly to the above-mentioned examples. The projected member 166 of this embodiment further includes a secondary conductor 290 made of the ferromagnetic material and fixed on the axial end of the shaft 135. A liner motor 295 is provided below the branch section of the guide rail 120 where the branch rail 124 branches from the main rail 122. The configuration and the type of the linear motor 295 is not limited as far as the linear motor 295 produces, by current supply, the impellent force Z which directs across the guide rail 120 toward the branch rail 124. The projected member 106 is moved laterally by the impellent force Z of the linear motor 290 so as to be introduced into and guided by the branch rail 124.

While there has been described in connection with the preferred embodiments of the conveying-path change-over device, it will be obvious to those skilled in the art that various changes and modifications may be made therein without departing from the invention. For example, as shown in FIG. 27, the electromagnet 213 and the magnet 250 or electromagnet 250' of the embodiment shown in FIG. 4 may be united to each other through a yoke.

Figure 27:
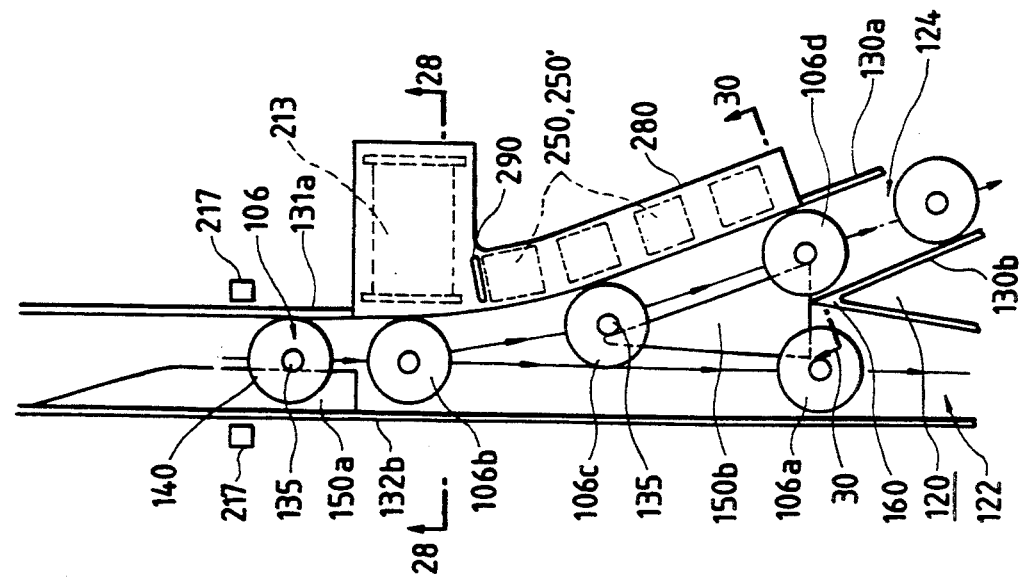
FIG. 27 is a top view showing essential components of another example of the change-over mechanism in the sorting conveyor according to the present invention.

In the change-over mechanism shown in FIG. 27, an electromagnet 213 and a plurality of permanent magnets 250 or electromagnets 250' are untied together though a yoke 280. A lateral end, i.e. the left-hand side end of the yoke 280 forms a part of the side wall 130a of the branch rail 124. The lateral end of the yoke 280 has substantially the same dimension as the thickness of the guide wheel 140 as shown in FIG. 28 and connects the side wall 131a to side wall 130a with no gap, so as to smoothly guide the guide wheel or rotary member 140 of the projected member 106 therealong.

Figure 28:
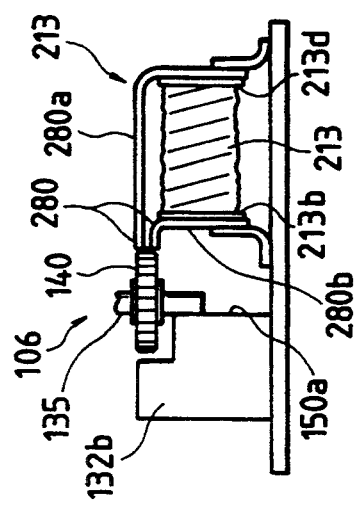
FIG. 28 is a sectional view taken along line 28—28 of FIG. 27.
Figure 29:
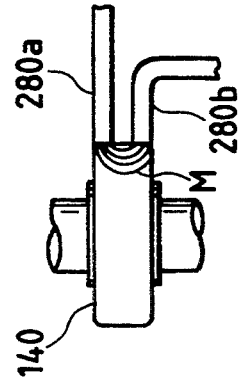
FIG. 29 is an enlarged view of a major part of FIG. 28.

As shown in FIG. 28, the yoke 280 includes a first yoke member 280a connected to a magnetic pole 213a of the electromagnet 213, and bent into a L-shaped to be directed toward the guide rail 132b and laid over a coil of the electromagnet 213, and a second yoke member 280b connected to the other magnetic pole 213b and similarly bent toward the guide rail 132b. Distal ends of the first and second yoke member 280a, 280b constitute the aforementioned lateral end of the yoke 280 and are positioned to correspond to a level of the rotary member 140 suspended from the moving shoe 104 through the shaft 135. As best shown in FIG. 29, the first and second yoke members 280a, 280b are spaced from each other with a predetermined gap so that the closed loop M of the magnetic circuit is formed between the rotary member 140 and the yoke 280 when the rotary member 140 is brought into contact with the yoke 280 in a state where the electromagnet 213 is energized. This yoke arrangement can concentrate and strengthen the magnetic force of the electromagnet 213 so as to surely attract the rotary member 140 thereto in the sorting operation. Additionally, the gap may be filled with a spacer if desired.

Figure 30:
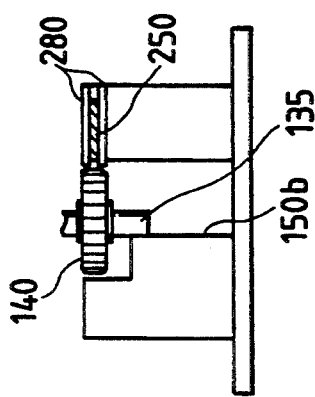
FIG. 30 is a sectional view taken along line 30—30 in FIG. 27.
Figure 31:
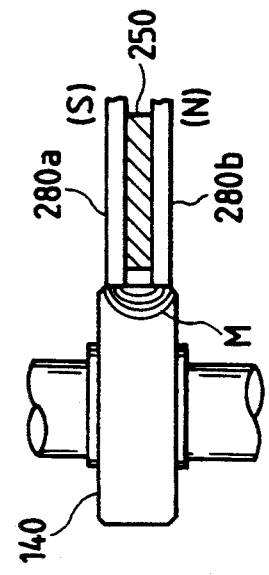
FIG. 31 is an enlarged view of a major part of FIG. 30 in a case where a permanent magnet is used as a downstream magnet.
Figure 32A:
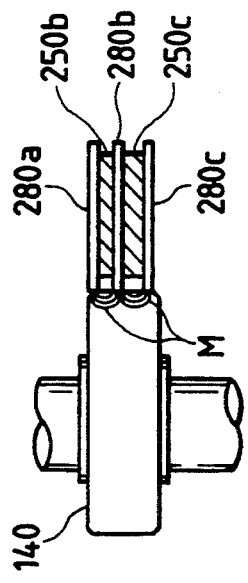
FIG. 32A and 32B are enlarged views, each showing a modification of the arrangement shown in FIG. 31.
Figure 32B:
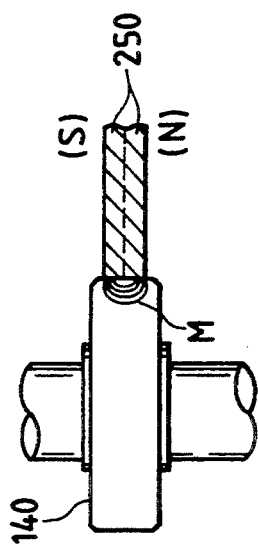

The first and second yoke members 218a, 218b are elongated to the upstream end of the side wall 130a of the branch guide rail 124 to cover all of the permanent magnet 250 or electromagnet 250′. In a case where permanent magnets 250 are used in this mechanism, each of the permanent magnets 250 having the same thickness as that of the gap is interposed and held between the first and second yoke members 280a and 280b as shown in FIG. 30. In this case, also, the closed loop M of the magnetic circuit is formed between the permanent magnet 250 and the rotary member 140 through the yoke 280, as best shown in FIG. 31. In addition, the permanent magnet 250 is so arranged as to magnetize each of the first and second yoke members in the same polarity as the magnet 250 and the electromagnet 213 does. That is, if the first yoke member 280a is magnetized in S polarity by the electromagnet 213, the permanent magnet 250 is so arranged as to magnetize the first yoke member 280a in S polarity. Various arrangement may be applicable in stead of the arrangement in which a single permanent magnet 250 is vertically interposed between two yoke members 280a and 280b. For example, as shown in FIG. 32A, it is possible to arrange a plurality of yoke members (three yoke members 280a, 280b and 280c are shown in the drawing) and a plurality of permanent magnets (two permanent magnet 280b and 280c are shown in the drawing) alternately in order to form a plurality of closed magnetic loops corresponding in number to the permanent magnets. As shown in FIG. 32B, the closed magnetic loop may be formed without the yoke 280.

If the magnet located downstream of the electromagnet 213 is constituted by an electromagnet 250′, the cross-sectional view taken along line 30—30 is substantially the same view as that shown in FIG. 28.

Returning to FIG. 27, a slit 290 is formed between the electromagnet 213 and a most upstream one of the permanent magnet 250 or electromagnet 250′ so as to pass through the each of the first and second yoke members 280a and 280b. The slit 290 functions so as to effectively prevent the heat generated in conjunction with the energization of the electromagnet 213 from being transmitted to the permanent magnet 250 or electromagnet 250′ through the yoke 18 resulting in a thermal damage that the magnitude of the attractive force of downstream magnets is decreased. This slip 290 also functions so as to prevent the unwanted magnetization of the yoke 280 near the electromagnet 213 due to the downstream magnets 250, 250′ resulting in the undesired attraction that the rotary member 140 is attracted to the yoke 280 due to the magnetic force of the downstream magnet 250, 250′ although the electromagnet 213 is not energized. This slit arrangement is particularly effective in a case where each downstream magnet is made up of the permanent magnet 250 since the permanent magnet is likely to be thermally damaged and yoke 280 is always magnetized by the permanent magnet 250. In order to achieve these two effect, other various arrangements may be applicable to the yoke. For example, a plurality of perforate holes may be formed though the yoke 280 in stead of the aforementioned slit 290. The yoke 280 may be divided into two sections, one corresponding to the electromagnet 213 and the other corresponding to the downstream magnets 250, 250′. Further, a non-magnetic material, antimagnetic material, thermally insulative material or the like may be provided in or filled into the divided part between the two sections.

A support shaft guide member 150a for guiding the support shaft 135 of the moving shoe 104 therealong may be provided on the side wall 132b of the guide rail 120 upstream of the electromagnet 213. The support shaft guide member 150a functions to move the projected member 106 laterally toward the side wall 131a through the support shaft 135 and bring the rotary member 140 into contact with the side wall 131a before the rotary member 140 approaches the electromagnet 213. Consequently, the rotary member 140 is surely brought into contact with the yoke 280. As shown in FIG. 28, a lower portion of the support shaft 135 projecting below the rotary member 140 is guided by and along a side face of the support shaft guide member 150a.

Another support shaft guide member 150b may be provided on the guide rail 120 upstream of a common junction 160 between the main rail 122 and the branch rail 124. The support shaft guide member 150b is in the form of a triangular shape as viewed from above, where an apex is located at the most upstream and two sides are respectively extending from the apex substantially along the main rail 122 and the branch rail 124. As shown in FIG. 30, the lower portion of the support shaft 135 projecting below the rotary member 140 is guided by and along the side face of the support shaft guide member 150b. This support shaft guide member 150b functions so as to surely guide the projected member 106 toward the branch rail 124 when the electromagnet 213 is activated for sorting operation, and further to advance the completion of the sorting operation depending only on the magnetic attraction in the conveying-path change-over mechanism from the position shown by reference numeral 106d to the position shown by reference numeral 106c.

Figure 44:
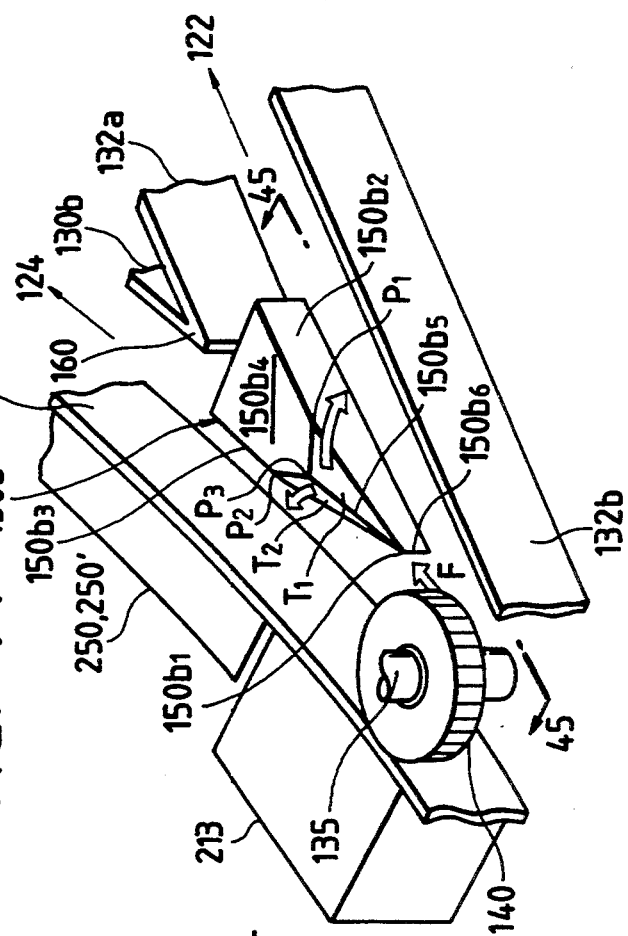
FIG. 44 shows a perspective view showing a yet another example of the conveying-path change-over mechanism of the present invention.
Figure 45:
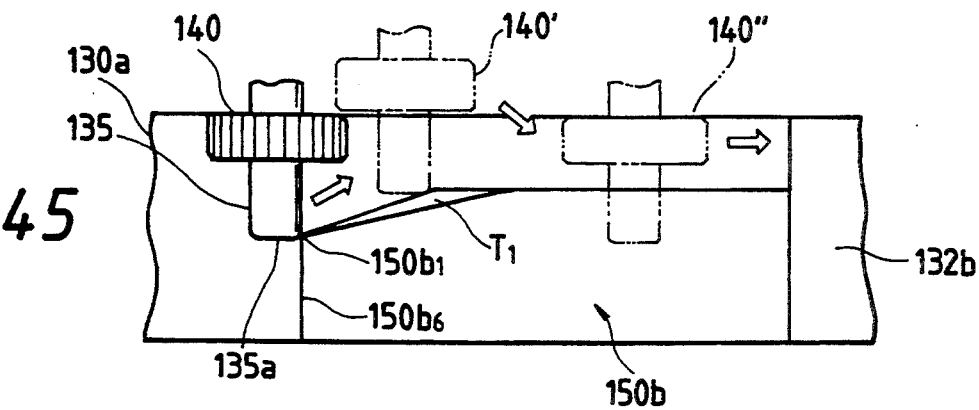
FIG. 45 shows a side view as viewed in a direction of an arrow 45—45 of FIG. 44.
Figure 46:
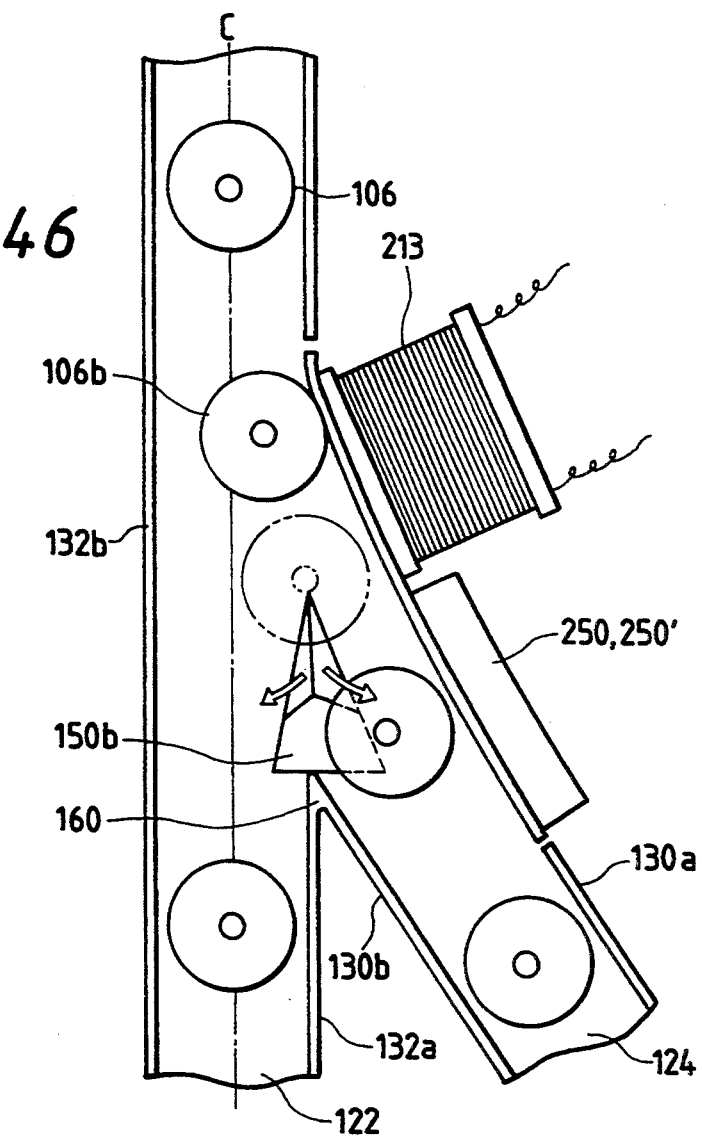
FIG. 46 shows a top view showing the example shown in FIG. 44.

It is preferable that the support shaft guide member 150b is arranged as shown in FIGS. 44–46 in order to positively prevent an accidental stoppage and/or damage of the sorting conveyor due to the collision of the projected member 106 against the support shaft guide member 150b. The support shaft guide member 150b shown in FIGS. 44–46 is chamfered between the upper surface $150b_4$ and each of the side faces $150b_2$ and $150b_3$ to provide tapered guide surfaces T1 and T2 having a common edge line $150b_5$ which extends obliquely downward from the upper surface $150b_4$ of the support shaft guide member 150b to the apex $150b_1$. The common edge line $140b_5$ is parallel with an center line C of the main rail 122 in a plane view as shown in FIG. 46. The tapered guide surfaces T1 and T2 is also slanted obliquely downward from the common edge line $150b_5$ toward respective side faces $150b_2$ and $150b_3$ so as to forcibly guide the support shaft 140 toward respective guide rail 122 and 124. The height of the apex $150b_1$ of the support shaft guide member 150b is so selected as to be coincident with to that of the axial end 135a of the support shaft 135 as best shown in FIG. 45. The apex $150b_1$ may be located slightly below the axial end $135a$. End points P1 and P3 of the tapered guide surfaces T1 and T2 are located downstream relative to an end point P3 of the edge line $150b_5$ in FIG. 44, but may be located upstream relative to the end point P3 of the edge line. The apex $150b_1$ is located upstream relative to the common junction 160 between the guide rails 122 and 124 and deviated from the center line C of the main rail 122 toward the branch rail 124. The position of the apex $150b_1$ is appropriately determined based on the branching angle between the main rail 122 and branch rail 124, the conveying speed of the sorting conveyor or the like.

Figure 47:
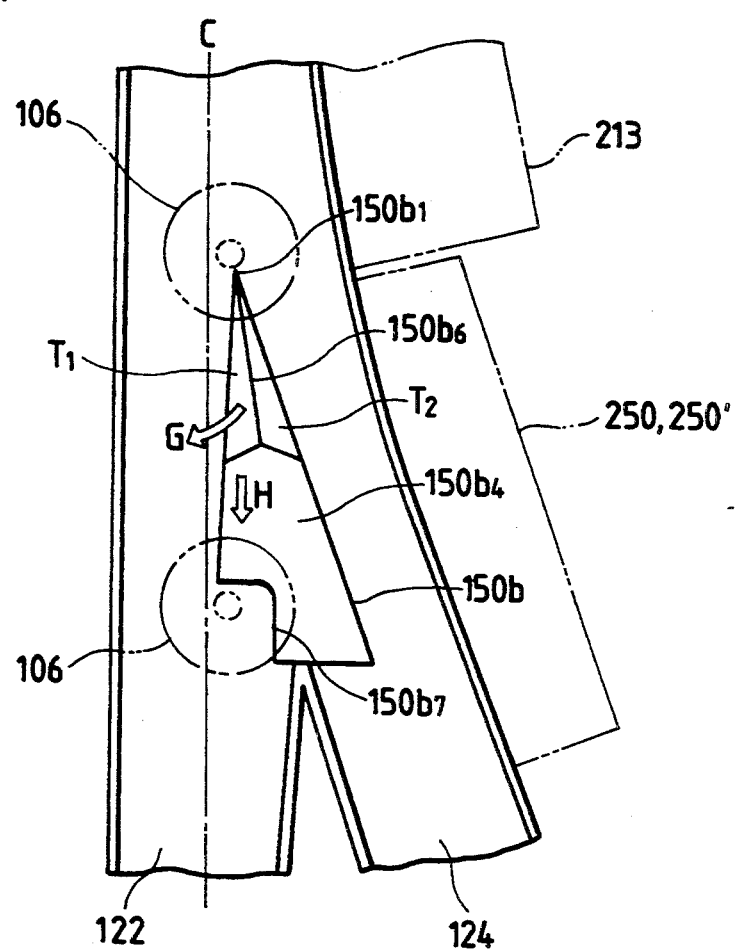
FIG. 47 shows a top view showing a modification of the example shown in FIG. 44.

The support shaft guide member $150b$ thus constructed functions as follows:

When the projected member 106 is not sufficiently attracted toward the branch rail 124 by the electromagnet 213, the support shaft 135 of the projected member 106 rides on either one of the tapered guide surfaces T1 and T2, so that the support shaft 135 is slid along and guided by the tapered guide surface T1 or T2. Accordingly, the projected member 106 is surely guided toward either the main rail 122 or the branch rail 124 without any collision of the support shaft 135 against the support shaft guide member $150b$. Even if the support shaft 135 is moved on a prolongation of the edge $150b_5$ toward the support shaft guide member $150b$, the support shaft 135 rides on the guide member $150b$ at the apex $150b_1$, slid obliquely downward on one of the tapered guide surface T1 and T2, and then delivered to corresponding one of the main rail 122 and branch rail 124, which faces the tapered guide surface on which the support shaft 135 is slid, as shown in FIG. 45. Thus, the tapered guide surfaces T1 and T2 of the support shaft guide member $150b$ function so as to forcibly guide the support shaft 135 toward either one of the main rail 122 and the branch rail 124 surely, and to positively prevent the accidental stoppage and/or damage of the sorting conveyor due to the collision of the support shaft 135 against the apex $150b_1$ of the support shaft guide member $150b$. The support shaft guide member $150b$ may be arranged so that the apex $150b_1$ is located closer to the center line C of the main rail 122 as shown in FIG. 47 in comparison with the embodiment shown in FIGS. 44-46. In this case, the edge $150b_6$ of the support shaft guide member $150b$ is not parallel to the center line C and extends from the apex $150b_1$ toward the branch rail 124 so that the support shaft 135 ride on the guide member $150b$ at the apex $150b_1$ is guided by the tapered guide surface T1 toward the main rail 122. As illustrated in FIG. 47, a notch portion $150b_7$ may be formed in the support shaft guide member $150b$ so that the support shaft 150 which exceeds the tapered guide surface T1 and rides on the upper surface $150b_4$ of the guide member $150b$ (arrow H) because of the high speed conveyance is delivered to the main rail 122. The projected member 106 whose support shaft 135 falls down from the upper surface $150b_4$ to the main rail 122 through the notch portion $150b_7$, is subsequently guided by the side wall of the main rail 122. The notch portion $150b_7$ may be formed in the support shaft guide member $150b$ at a side where the branch rail 124 is provided. Also, the apex $150b_1$ and the edge $150b_6$ may be arranged so that the support shaft 135 which rides on the support shaft guide member $150b$ at the apex $150b_1$ is forcibly guided to the branch rail 124.

Further, many modifications for reducing the load of the electromagnet can be applied to the conveying-path change-over device of the present invention.

Figure 33:
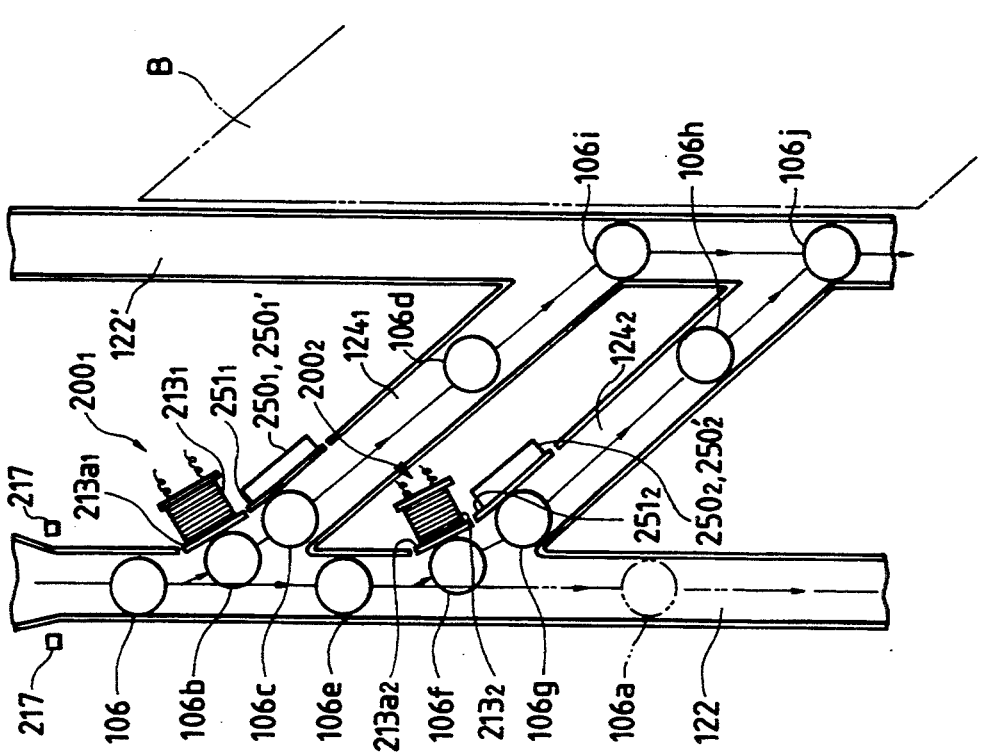

For example, a plurality of change-over mechanisms may be provided in the sorting conveyor in order to sort a conveyed package to a single downstream conveyor. FIG. 33 shows a sorting conveyor to which such modification is applied utilizing the change-over device or mechanism shown in FIG. 4. The sorting conveyor shown in FIG. 33 includes first and second conveying-path change-over mechanisms $200_1$ and $200_2$ provided on inlet portions of first and second branch rails $124_1$ and $124_2$, respectively. The same or similar reference numerals are denoted to the parts corresponding functionally or equivalent to those shown in FIG. 4, so that detailed description is omitted here. In addition, reference numeral $122'$ designates another main rail for guiding projected members which have been already moved from left hand side to right hand side to sort a package to a right hand side downstream conveyor before reaching the sorting position shown in FIG. 33, projected members which are to be moved from the right hand side to the left hand side to sort a package to a lift hand side downstream conveyor after passing through the sorting position shown in FIG. 33, or the like.

Operation of this sorting conveyor is as follows: When a package conveyed together with the slat 102 is not to be sorted in the sorting position as shown in FIG. 33, neither the first change-over mechanism $200_1$ nor the second change-over mechanism $200_2$ is activated so theft the projected member 106 is moved straightly along the main rail 122 as indicated by reference numerals 106, $106e$ and $106a$. When the conveyed package is to be sorted to the right hand side downstream conveyor B, one of the change-over mechanism (for example, a first change-over mechanism $200_1$) is activated while keeping the other change-over mechanism (i.e. the second change-over mechanism $200_2$) resting so that the projected member 106 is moved toward the first branch rail $124_1$ by the first change-over mechanism $200_1$ and guided along the first branch rail $124_1$ as indicated by the reference numerals 106, $106b$, $106c$, $106d$ and $106i$ to sort the package to the downstream conveyor B. Thereafter, when the next package to be sorted is conveyed to the sorting position as shown in FIG. 33, the operation is shifted through a switching means (not shown in the drawing) so that the second change-over mechanism $200_2$ is activated whereas the first change-over mechanisms $200_1$ is kept resting. Therefore, the projected member 106 in this case is moved to the second branch rail $124_2$ by the second change-over mechanism $200_2$ and guided along the second branch rail $124_2$ as indicated by the reference numerals 106, $106e$, $106f$, $106g$, $106h$ and $106j$ so that the package is sorted to the downstream conveyor B. As is apparent from the above-description, the packages conveyed to the sorting position as shown in FIG. 33 can be sorted to the downstream conveyor B by utilizing alternately the first and second change-over mechanisms $200_1$ and $200_2$. Therefore, it is possible to prevent thermal damage caused on the change-over mechanism due to the continuous energization applied to the electromagnets 213 and/or $250'$ since one change-over mechanism can be rested when the other change-over mechanism is activated. In the above-noted modification, the first and second change-over mechanisms $200_1$ and $200_2$ are utilized alternately one by one of the packages. However, the modification should not be restricted thereto or thereby. For example, it is also possible in the above-noted modified example that the first change-over mechanism $200_1$ continues to sort a predetermined number of packages toward the downstream conveyor B and thereafter the sorting operation is shifted from the first change-over mechanism $200_1$ to the second change-over mechanism $200_2$ by the switching means so that the second change-over mechanism $200_2$ continues to sort the predetermined packages toward the downstream conveyor B. Further, the shifting of the sorting operation between the first and second change-over mechanisms can be performed every predetermined time period. Furthermore, thermal sensors are respectively provided for the change-over mechanism $200_1$ and $200_2$ so that the sorting operation is shifted by the switching means depending on the detected value of the thermal sensors, thereby preventing the thermal damage. Moreover, it is possible that the first change-over mechanism $200_1$ is used as a main change-over device whereas the second change-over mechanism is used as a secondary change-over device. That is, if a package to be sorted to the downstream conveyor B is not accidentally sorted by the first change-over mechanism $200_1$, then such circumstance is detected, for instance by a sensor provided on the main rail 122 between the two branch rails, upon which the second change-over mechanism $200_2$ is activated to sort the package to the downstream conveyor B surely. Also, if one of the first and second change-over devices $200_1$ and $200_2$ must be repaired or replaced with a new one, then such repair and replacement for one change-over device can be performed without stoppage of the conveyor since the other change-over device can perform the desired sorting operation.

Figure 34:
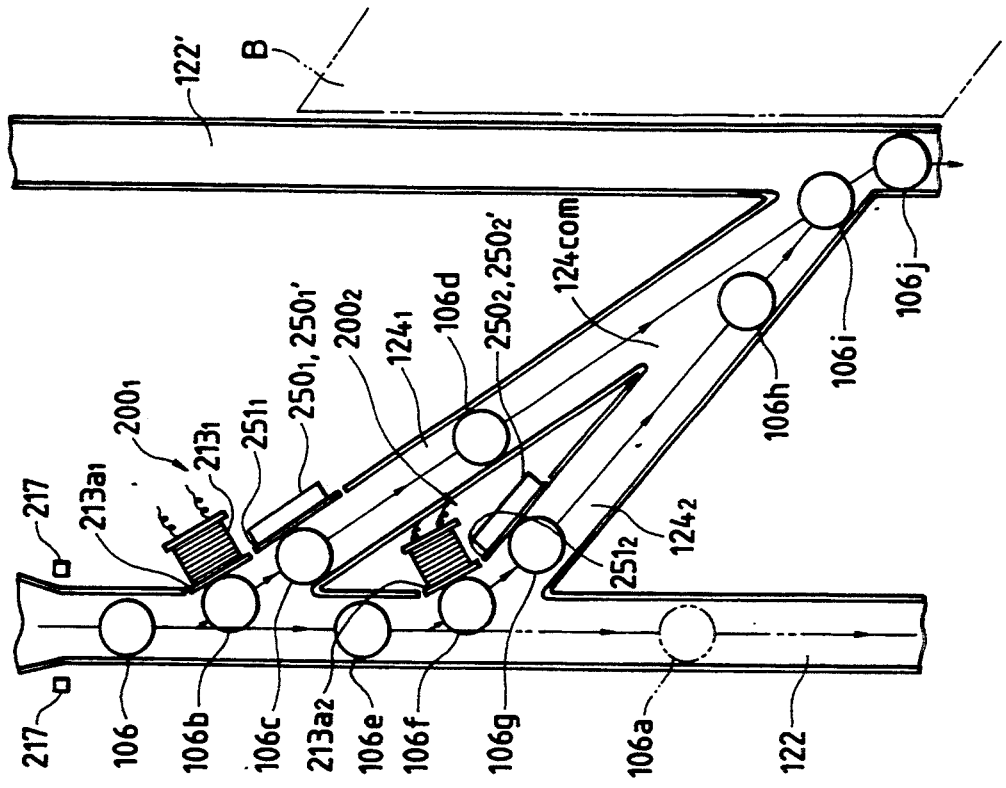
FIGS. 33–36 are top views respectively showing modifications of the change-over mechanism in the sorting conveyor according to the present invention, in which a plurality of change-over devices and a plurality of branch guide rails are provided.

FIG. 34 shows a similar modification in which a plurality of change-over mechanisms and a plurality of branch rails are provided for one downstream conveyor. Difference of the arrangement shown in FIG. 34 from that shown in FIG. 33 is that a plurality of the branch rails are jointed together as a common branch rail $124_{com}$ near the downstream conveyor B. According to this arrangement, the projected member 106 is guided to the rail 122' at the same position regardless of whether the first change-over mechanism $200_1$ or the second change-over mechanism $200_2$ is utilized for sorting operation, so that it is possible to reduce the width of the downstream conveyor along the conveying direction F.

Figure 36:
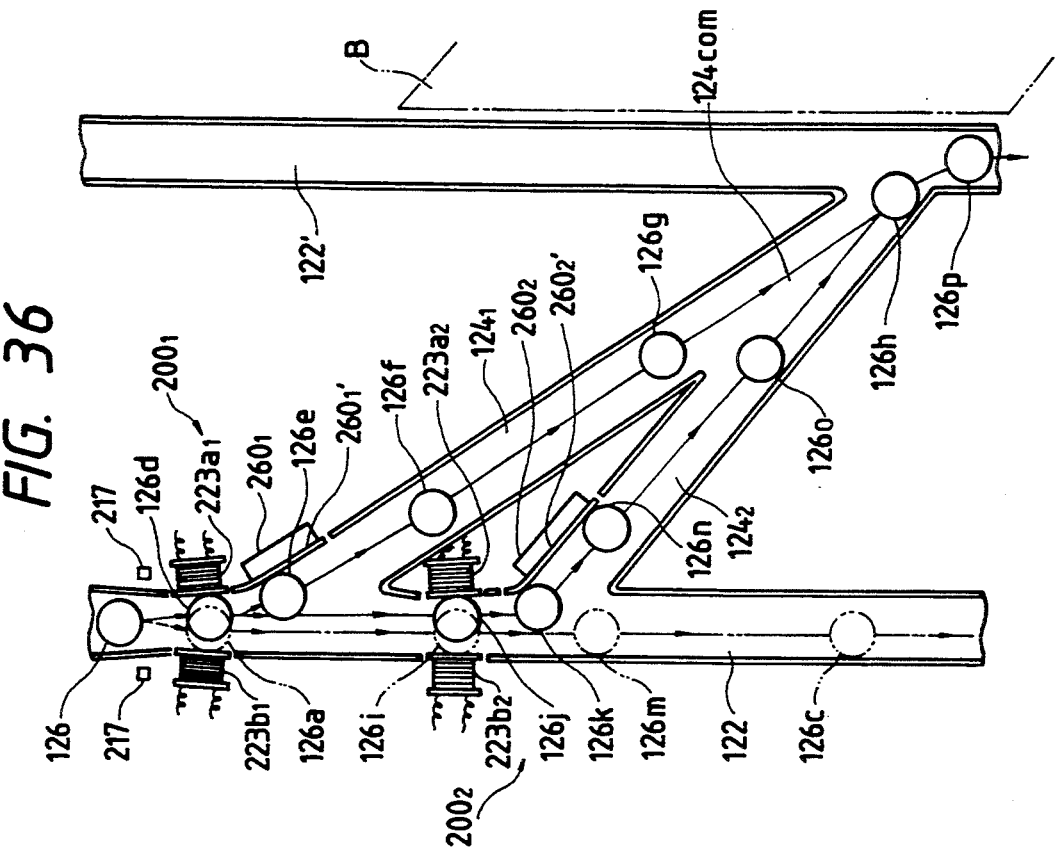
Figure 35:
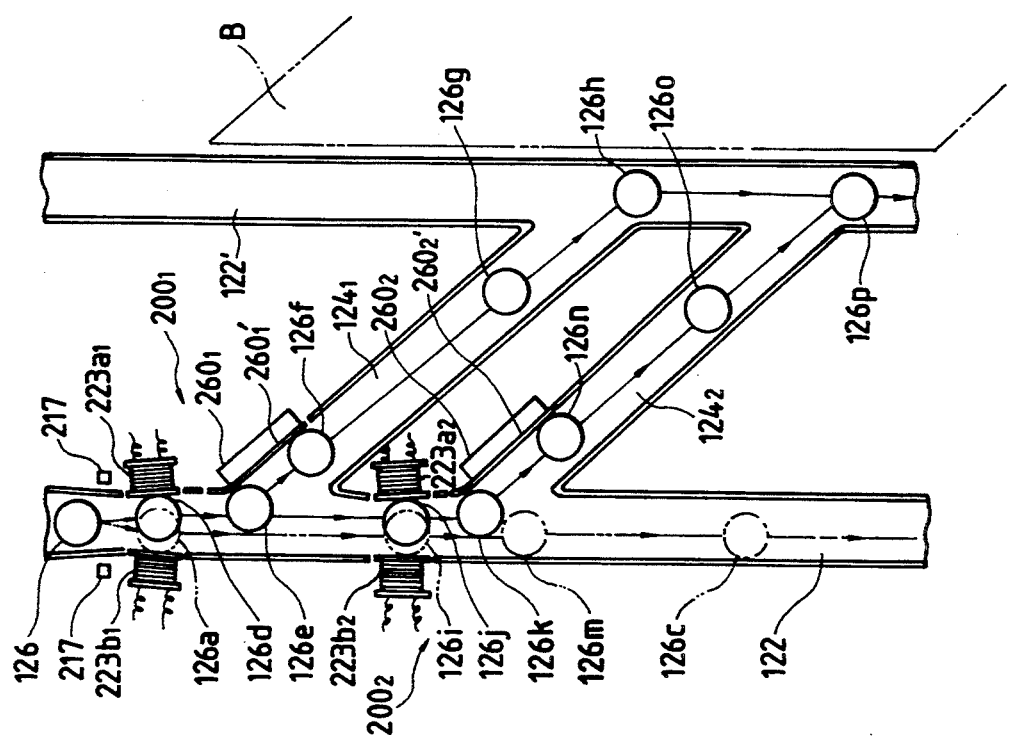

These modifications shown in FIG. 33 and 34 can be applied to the various embodiments of the present invention in order to reduce the load of the electromagnets. The cases where these modifications are applied to the embodiment shown in FIG. 5, are illustrated in FIGS. 35 and 36 as examples.

Figure 39:
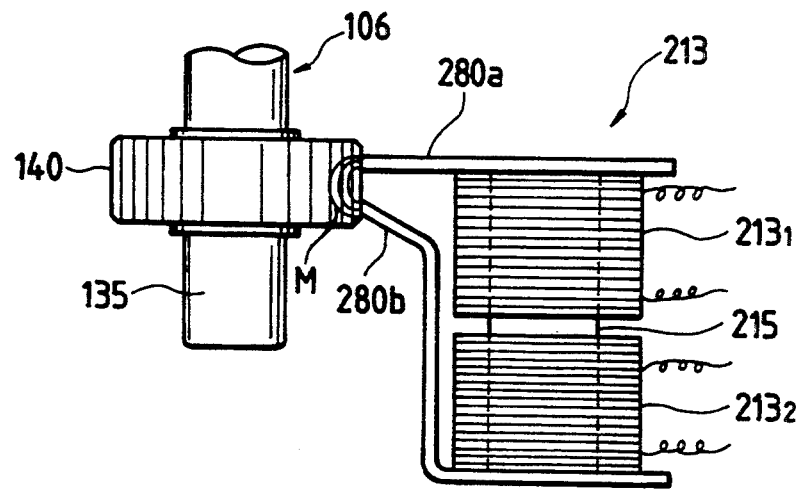
Figure 40A:
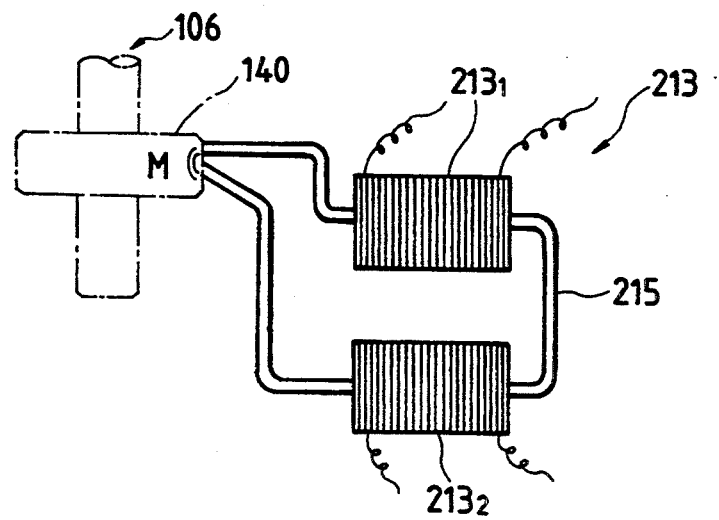
Figure 40B:
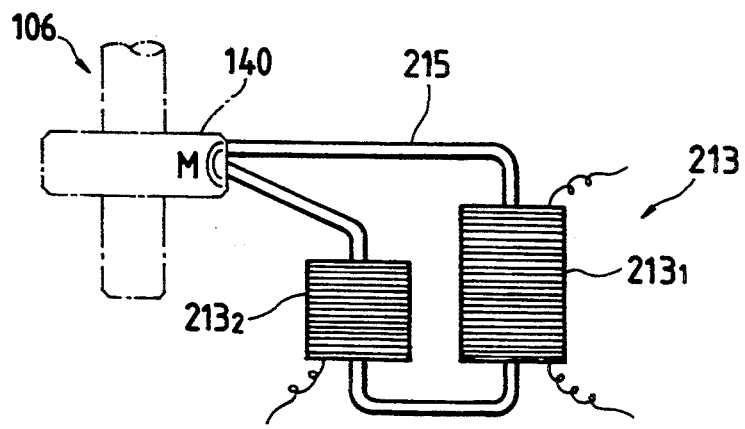

Moreover, another modification can be made to the electromagnet 213 itself in order to prevent the thermal damage caused on the change-over mechanism of the present invention due to the excessive continuous energization. For example, as shown in FIG. 37, the electromagnet 213 in the change-over mechanism 200 may be made up of first and second independent electromagnet elements $213_1$ and $213_2$ which are alternately used by the action of a switching means for the sorting operation as similarly to the first and second electromagnets $213_1$ and $213_2$ of the sorting conveyor shown in FIG. 33. That is, when a package conveyed together with the slat 102 is not to be sorted in the sorting position as shown in FIG. 33, neither the first electromagnet element $213_1$ nor the second electromagnet element $213_2$ is activated so that the projected member 106 is moved straightly along the main rail 122 as indicated by reference numerals 106 and 106a. When the conveyed package is to be sorted to the downstream conveyor, one of the electromagnet elements (for example, a first electromagnet element $213_1$) is activated while keeping the other electromagnet element (i.e. the second electromagnet element $213_2$) resting so that the projected member 106 is moved toward the branch rail 124 by the action of the first electromagnet element $213_1$ and guided along the branch rail 124 as indicated by the reference numerals 106, 106b, 106c and 106d to sort the package to the downstream conveyor. Thereafter, when the next package to be sorted is conveyed to the sorting position as shown in FIG. 37, the operation is shifted through the switching means (not shown in the drawing) so that the second electromagnet element $213_2$ is activated whereas the first electromagnet element $213_1$ is kept resting. Therefore, the projected member 106 in this case is also moved to the branch rail 124 by the action of the second electromagnet element $213_2$ and guided along the branch rail 124 as indicated by the reference numerals 106, 106b, 106c and 106d so that the package is sorted to the downstream conveyor. Since the packages conveyed to the sorting position as shown in FIG. 37 can be sorted to the downstream conveyor by utilizing alternately the first and second electromagnet elements $213_1$ and $213_2$, it is possible, as similarly to the arrangement shown in FIG. 33, to prevent thermal damage caused on the change-over mechanism 200 due to the continuous energization applied to the electromagnets 213. In addition, if the first and second electromagnet elements $213_1$ and $213_2$ are simultaneously activated, then the electromagnet 213 can produce a larger magnetic attractive force per a unit current in comparison with that having a single windings. Similar modification can be applied to the downstream electromagnets 250'. An importance of this modification is that the electromagnet 213 is made up of a plurality of electromagnet elements so that one of electromagnet elements can be rested even under a condition that the projected member 106 must be sorted to the branch rail 124. Therefore, the disposition and the number of the electromagnet elements should not be restricted to those shown in FIG. 37. The electromagnet elements $213_1$ and $213_2$ may be disposed to be juxtaposed along the guide rail, i.e. the branch rail 124 in an upstanding manner as can be seen from FIG. 38A, and to be juxtaposed perpendicularly relative the extending direction of the branch rail 124 in the upstanding manner as can be seen in FIG. 38B. Further, as illustrated in FIG. 39, it is possible that a pair of upper and lower coils are wound around a common central core 215 to constitute the first and second electromagnet elements $213_1$ and $213_2$. In this case, the entire electromagnet 213 can be miniaturized to increase the freedom of design for the branch portion. Yoke members 280a and 280b of magnetic or ferromagnetic material may be respectively attached to the pole ends of the electromagnet 213 made up of the first and second electromagnet elements $213_1$ and $213_2$ so as to constitute a part of the side wall of the branch guide rail 124 and form the closed magnetic loop or circuit M. The yoke members 280a and 280b may be arranged to extend in parallel relation to each other to constitute the part of the side wall. In addition, an inclined arrangement that one of distal portions of the yoke members 280a and 280b is arranged in an inclined manner (i.e., the lower yoke member 280b extends with an angle relative to the upper horizontal yoke member 280a in FIG. 39), can enhance the effective generation of the magnetic flux from the yoke members 280a and 280b. Furthermore, as shown in FIGS. 40A and 40B, the common core 215 having therearound a pair of coil windings constituting the first and second electromagnet elements $213_1$ and $213_2$, may be processed so that the closed magnetic loop or circuit M is formed between the core 215 and the rotary member 140 through both ends of the core 215. In this case, also, an inclined arrangement that one of end portions of the core 215 is arranged in an inclined manner (i.e., the lower end portion of the core 215 extends with an angle relative to the upper horizontal end portion of the core 215 in FIG. 40A and 40B), can enhance the effective generation of the magnetic flux from the core 215.

As was described above, in the conveying-path change-over device of the invention, the part of the side wall of the branch rail which part is located near the inlet of the branching portion of the guide rail where the branch rail branches from the main rail is made up of the side wall provided by the electromagnet, so that the projected members of magnetic substance are led to the branch rail as the electromagnet providing the upper side wall is energized. That is, the change-over device of the invention, being simple in arrangement and in construction, is able to smoothly switch the directions of conveyance of articles on the conveyor as desired; that is, it is able to move the articles straightly in the main direction, or laterally of the conveyor in the branch direction.

Hence, with the change-over device of the invention, the article sorting operation can be achieved merely by controlling the energization of the electromagnet, and the article conveying directions can be positively switched, and the time required for switch the article conveying directions can be greatly reduced.

Furthermore, in the change-over device of the invention, the moving shoes on the slats, unlike the conventional ones, can be manufactured at lower cost, because it is unnecessary all the moving shoes to have magnets.

The change-over mechanism, operating on the energization of the electromagnet, is simple in arrangement, and small in the number of components. Therefore, it is advantageous in the reduction of manufacturing cost and in the scale of arrangement. With the change-over mechanism, the article conveying directions or paths are switched electrically (not mechanically). Hence, the change-over mechanism is less troubled in operation, and produces only low noises when operated.

Furthermore, each of the projected members is made up of a roller or bearing. Therefore, the projected members are smoothly moved along the guide rail, and when the article conveying paths are switched, noises are less produced.

Even in a case where a permanent magnet is used in place of the electromagnet for selectively introducing the projected member into the branch rail, the movement of the permanent magnet can be made small in the change-over device of the invention, thereby producing the similar advantageous effects. In the case of linear motor, the similar advantageous effects can be expected.

The above-noted arrangements and modifications for the change-over mechanism according to the present invention can be used for a shoe returning or shifting mechanism 300 in the sorting device. This case will be described hereunder.

After the sorting operation as mentioned above, each slat 102 is moved to the returning region 118 located opposite to the conveying surface, and in the returning region 118 it is moved in the direction (of the arrow R) opposite to the direction of conveyance (i.e., the direction of the arrow F) on the conveying surface.

In the case where the article X is to be moved to the right-handed side in FIG. 2 (i.e., towards the conveyor B), in the conveying region 116 the moving shoes 104 of the slats 102 on the conveying surface are moved towards the right ends of the slats 104 which are on the right-handed side in the longitudinal direction of the latter; whereas in the case where the article X is to be moved to the left-handed side in FIG. 2 (i.e., towards the conveyor C), in the conveying region 116 the moving shoes 104 of the slats 102 are moved towards the left ends of the slats 102, thus reaching the downstream end 114 of the sorting conveyor. After reaching the downstream end 114 of the sorting conveyor, the moving shoe 104 of each slat 102 from which the article X has been delivered to the conveyor B is moved to the returning region 118 while being kept on the right-handed portion of its slat 102; whereas the moving shoe 104 from which the article X has been delivered to the conveyor C is moved to the returning region 118 while being kept on the left-handed portion of its slat 102.

In order to classify or sort articles X on the sorting conveyor 100 which are successively delivered thereto from the upstream conveyor A, the moving shoes 104 moving through the returning region 106 while being kept on the right-handed or left-handed portions of the slats 102 should be shifted right or left ends of the slats at the upstream end 112 of the sorting conveyor 100 according to the given sorting data.

For thus purposes, a shoe shifting mechanism 300 is provided on the rear side of the slat surface in the returning region 118 of the sorting conveyor 100.

Figure 11:
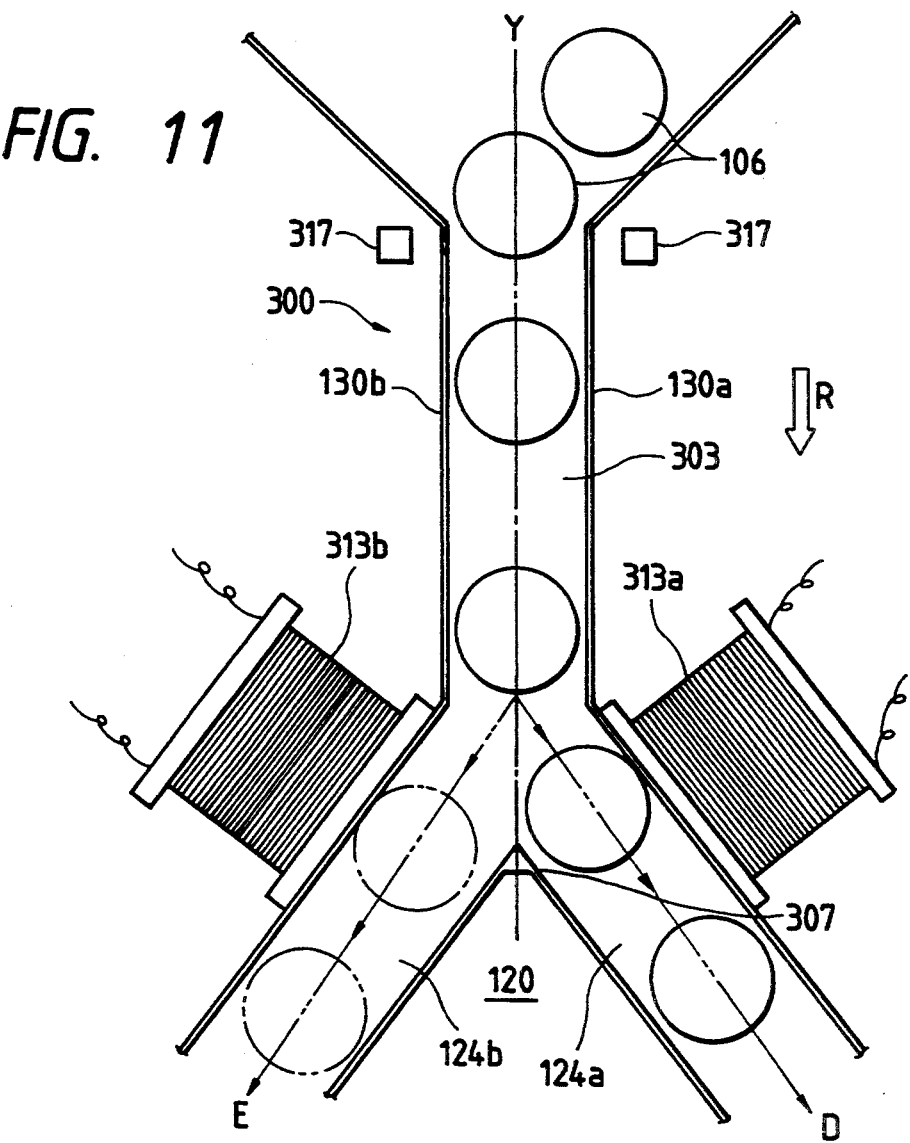
FIG. 11 is a top view showing essential components of an example of a shoe shift mechanism in the sorting conveyor according to the present invention.

FIG. 11 shows an example of a shoe shifting device 300, which partially utilizes the arrangement of the present invention as shown in FIG. 5. The shoe shifting mechanism 300 comprises: a shoe centering guide rail 303 including a pair of side walls 130a and 130b; branch guide rails 124a and 124b which branch right and left (in the directions of the arrows D and E) from the shoe centering guide rail 303; and a pair of electromagnets 313a and 313b disposed near the branching point of the branch guide rails 124a and 124b.

The guide wheel 140 of the projected member 106 of the moving shoe 104 moving through the returning region in the direction of the arrow R is first guided by the shoe centering guide rail 303 of the shoe shifting mechanism 300, and then led to one of the branch guide rails 124a and 124b which is on the side where one of the electromagnets 313a and 313b is provided which is energized in response to a shoe shifting signal. Sensors 317 are provided at the upstream end of the shoe centering guide rail 303, to detect the passage of each of the projected member 106, thereby to control the energization of the electromagnets 313a and 313b.

Thus, as the projected member 106 moves, the moving shoe 104 is moved in the direction of the arrow D or E. As a result, the moving shoe 104 is moved to the conveying region 116 after being shifted to either end of the slat 102 as desired. According to the shoe shifting mechanism 300, before the article X on the conveyor A upstream of the sorting conveyor 100 reaches the upstream end 112 of the latter 100, the moving shoes 104 can be shifted to the right or left end of conveying surface of the sorting conveyor 100 according to the sorting data. In addition, the position of installation of the shoe shifting mechanism 300 may be suitably adjusted according to the speed of movement of the article X on the conveyor A.

In the shoe shifting mechanism 300 as shown in FIG. 11, the common end (or junction) 307 of the branch guide rails 124a and 124b is on the central axis Y of the shoe centering guide rail 303. Hence, when power failure occurs, or when the power switch is turned off at the end of the article sorting operation, or when the electrical system of the mechanism becomes out of order, the electromagnets 313a and 313b cannot be energized, and therefore there is an adverse possibility that the projected member 106 moving along the shoe centering guide rail 303 is caused to strike against the common end 307 by its inertia.

In order to increase the article sorting speed, it is necessary to move the slats 102 forming the conveying surface to move in the conveying direction quickly. However, when the speed is increased, then the inertia of the projected member 106 is also increased, and therefore, when the projected member 106 strikes against the common end 307, the amount of shock given to the latter 307 is increased as much. Thus, the common end 307 may be broken in the long use of the shoe shifting mechanism.

For these reasons, it is preferable that the modification that the projected member 106 is prevented from striking against the common junction 307 of the branch guide rails 124a and 124b is applied to the above-mentioned arrangements of the shoe shifting mechanism.

Figure 12:
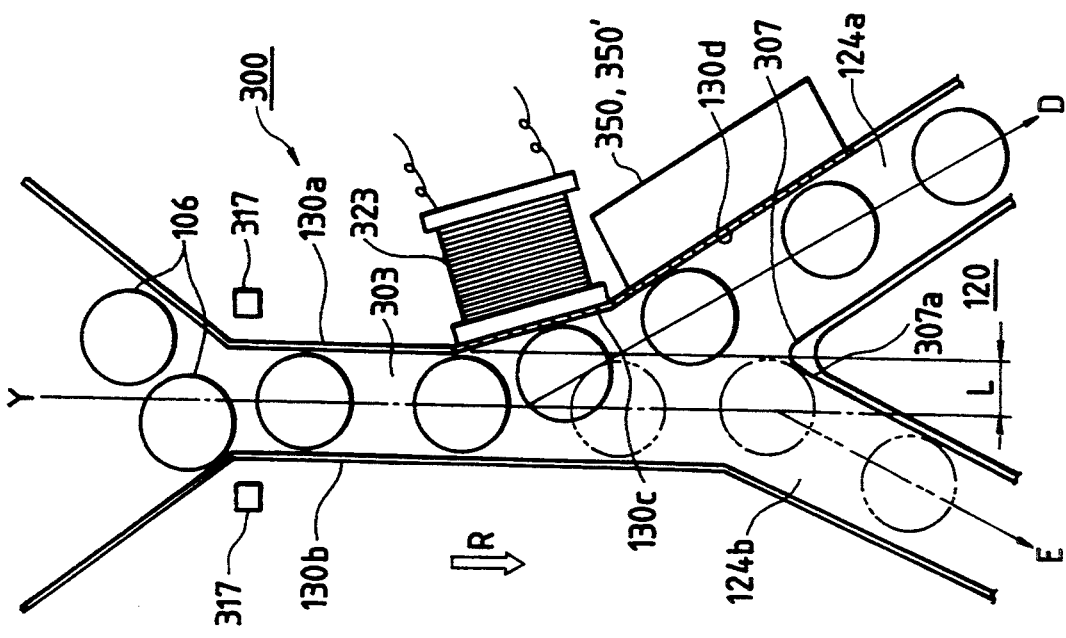
FIG. 12 is a top view showing essential components of another example of the shoe shift mechanism in the sorting conveyor according to the invention.

FIG. 12 shows another example of the shoe shifting mechanism according to the invention, which utilizes the arrangement shown in FIG. 4.

The shoe shifting mechanism 300 comprises: a shoe centering guide rail 303 made up of a pair of right and left side walls 130b and 130a the distance between which is slightly larger than the outside diameter of the projected members 106 (the wheel 140); and branch guide rails 124a and 124b extended right and left from the shoe centering guide rail 303.

The side wall 130a includes an upper side wall 130c which is bent outwardly at a given point on the shoe centering guide rail, and provided with an electromagnet 323; and a lower side wall 130d which is extended from the upper side wall 130c, thus forming part of a side wall of the branch guide rail 124a. The lower side wall 130d is provided with a permanent magnet or electromagnet 350, 350'.

The branch guide rails 124a and 124b have a common junction 307. The common junction 307 is on the prolongation of the side wall 130a which is located at a side where the upper side wall 130c and the lower side wall 130d are provided; more specifically, it is shifted as much as a distance L from the central axis Y of the shoe centering guide rail 303.

Each projected member 106 is guided downwardly (in the direction of the arrow R) in the shoe shifting mechanism 300 in FIG. 12. First, it passes through the shoe centering guide rail 303, thus being led to the branch guide rail 124a or 124b. Hence, the moving shoes 104, while moving through the returning region 118 (in FIG. 3), are shifted on the respective slats 102 to one side so as to be ready for the next sorting operation, and then moved towards the upstream end 112 of the sorting conveyor 100.

Sensors 317 for detecting the passage of each projected member 106 are disposed beside the shoe centering guide rail 303 at the upstream end, to output a projected member passage detection signal. This detection signal, and sorting data are utilized for control of the electromagnet 323 provided on the upper side wall 130c.

In the case where, after the sorting operation, each shoe 104 is to be shifted to the right end of the respective slat 102 at the upstream end (or the upper end) of the sorting conveyor 100 in FIG. 2, the electromagnet 323 on the upper side wall 130c of the shoe shifting mechanism 300 is energized, so that the projected member 106 moving along the shoe centering guide rail 303 is caused to move along the upper side wall 130c while being attracted by the electromagnet 323. Thereafter, the projected member 106 is allowed to move along the lower side wall 130d while being attracted by the electromagnet 350' or permanent magnet 350, so that it is led to the branch guide rail 124a merging with the lower side wall. Thus, the moving shoe 104 coupled to the projected member 106 is moved in the direction of the arrow D.

On the other hand, in the case where each shoe 104 is to be shifted to the left end of the respective slat 102, the electromagnet 323 is not energized. Hence, the projected member 106 moving along the shoe centering guide rail 303 is allowed to move downwardly without being attracted towards the upper side wall 130c, so that it is led to the branch guide rail 124b; that is, it is guided in the direction of the arrow E.

The width of the shoe centering guide rail 303 is slightly larger than the outside diameter of the projected member 106. Therefore, the projected members 106 are allowed to move downwardly along the central line Y of the shoe centering guide rail 303. As was described above, the common junction 307 of the branch guide rails 124a and 124b is shifted towards the branch guide rail 124a as much as the distance L from the central axis Y. Hence, the projected member 106 moving along the central axis Y towards the common junction 307 is caused to go along the side wall 307a of the branch guide rail 124b without striking against the common junction 307, thus being led into the branch guide rail 124b.

As was described above, when, in the shoe shifting mechanism, the electromagnet provided for the upper side wall is not energized, the projected members are led to the branch guide rail on the side which is opposite to the side where the upper side wall is located, without striking against the common junction of the two branch guide rails.

The electromagnet is not energized for instance in the following cases: the energization is controlled according to the sorting data, the energization is accidentally suspended because of power failure, the power switch of the conveyor is turned off after the sorting operation, and the electrical system of the conveyor becomes out of order.

Even in those cases, the projected member moving by its own inertia is led into the branch guide rail without striking against the common junction of the branch guide rails. Hence, in the invention, the guide rail will not be damaged.

As a result, the guide rails, being prevented from damage, are increased in service life, whereby the maintenance cost or running cost is reduced as much.

In addition, with the shoe shifting mechanism of the invention, the projected members will never collide with the common junction of the right and left branch guide rails. Hence, the projected member can be smoothly and positively led to the right or left branch guide rail, which makes it possible to classify the articles at higher speed.

Figure 13:
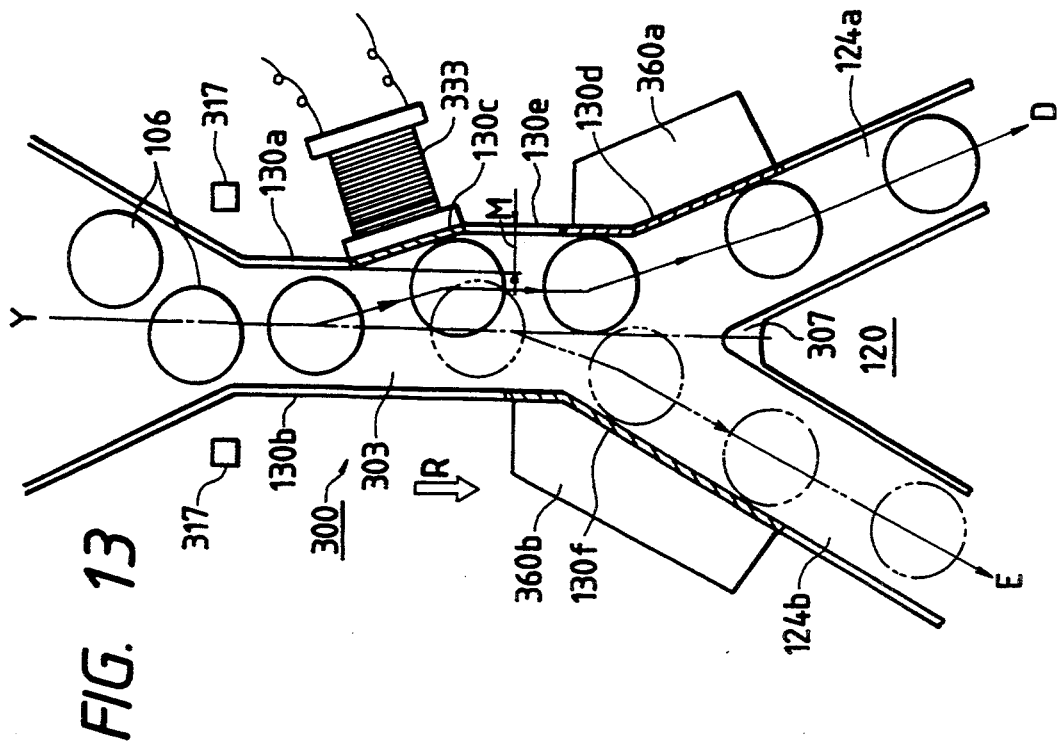
FIG. 13 is a top view showing essential components of yet another example of the shoe shift mechanism in the sorting conveyor according to the invention.

FIG. 13 shows another example of the shoe shifting mechanism 300 according to the invention.

The shoe shifting mechanism 300, similarly as in the case of the mechanism shown in FIG. 12, includes: a shoe centering guide rail 303 made up of a pair of right and left side walls 130a and 130b, the distance between which is slightly larger than the diameter of the projected member 106 (the wheel 140); and branch guide rails 124a and 124b which are extended from the shoe centering guide rail 303.

The shoe shifting mechanism 300 further includes an upper side wall 130c, an intermediate side wall 130e, and a lower side wall 130d. The upper side wall 130c is extended outwardly from the shoe centering guide rail 303 at a given point to a distance M from the central axis Y of the shoe centering guide rail 13, and has an electromagnet 323. The intermediate side wall 130e is extended downwardly (towards the branch guide rail 124a) from the upper side wall 130c. The lower side wall 130d is extended from the intermediate side wall 130e, thus forming part of a side wall of the branch guide rail 124a. The lower side wall 130d is provided with a permanent magnet 360a. The opposite side wall 130b is provided with a permanent magnet 360b in such a manner that the latter 360b is laid over the shoe centering guide rail 303 and the branch guide rail 124b.

Each of the projected member 106 is allowed to move downwardly (in the direction of the arrow R) in the shoe shifting mechanism 300 thus constructed. The projected member 106 passes through the shoe centering guide rail 303 first, and then led to the branch guide rail 124a or 124b. Hence, the moving shoes 104, while passing through the returning region 118 shown in FIG. 3, are shifted on the respective slats 102 to one side so as to be ready for the next sorting operation, and then moved to the upstream end 112 of the sorting conveyor 100.

Sensors 317 for detecting the passage of each projected member 106 are arranged beside the shoe centering guide rail 303 at the upper end, to output a guide wheel passage detection signal. The passage detection signal, and sorting data are utilized to control the electromagnet 333 provided on the upper side wall 130c.

In the case where, after the sorting operation, the moving shoes 104 are to be shifted to the right ends of the respective slats 102 at the upstream end (or the upper end in FIG. 2) of the sorting conveyor 100, the electromagnet 333 provided for the upper side wall 130c in the shoe shifting mechanism 300 is energized. As a result, each projected member 106 moving down the shoe centering guide rail 303 is first caused to move along the upper side wall 130c while being attracted by the electromagnet 333, and then to move along the intermediate side wall 130e and the lower side wall 130d while being attracted by the permanent magnet 360a, whereby it is led to the branch guide rail 124a. Thus, the moving shoe coupled to the projected member 106 is guided in the direction of the arrow D.

In the case where the moving shoes 104 are to be shifted to the left ends of the respective slats 102, the electromagnet 333 is not energized. Hence, each projected member 106 moving down the shoe centering guide rail 303 is allowed to move downwardly as it is, without being attracted towards the upper side wall 130c, and then move along the side wall 130f on which the permanent magnet 360b is arranged, thus being led to the branch guide rail 124b. That is, the moving shoe 104 is guided in the direction of the arrow E. More specifically, when the projected member 106 moving straightly along the central axis Y of the shoe centering guide rail 303 without being attracted towards the upper side wall 130c, comes near the intermediate side wall 130e, it is attracted towards the side wall 130f by the magnetic force of the permanent magnet 360b, because the latter 360b is located above the permanent magnet 360a to apply a stronger magnetic attraction force to the projected member 106. Hence, even when the projected member 106 comes near the common junction 307 of the branch guide rails 124a and 124b, it will not strike against the junction 307; that is, it is led along the side wall 130f into the branch guide rail 124b.

The common junction 307 of the branch guide rails 124a and 124b may be on the prolongation of the central axis Y of the shoe centering guide rail 303, or, similarly as in the above-described example of the shoe shifting mechanism, it may be shifted from the central axis Y towards the upper side wall 130c, so that the shoes are more smoothly guided into the branch guide rail 124b.

Figure 42:
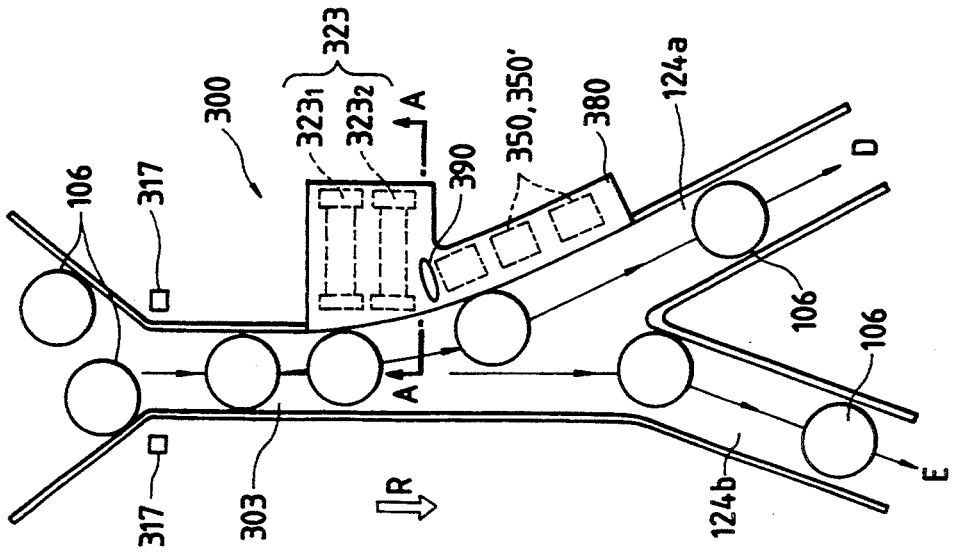
FIGS. 42 shows a top view showing essential components of further another example of the shoe returning or shifting mechanisms in the sorting conveyor according to the present invention.
Figure 41:
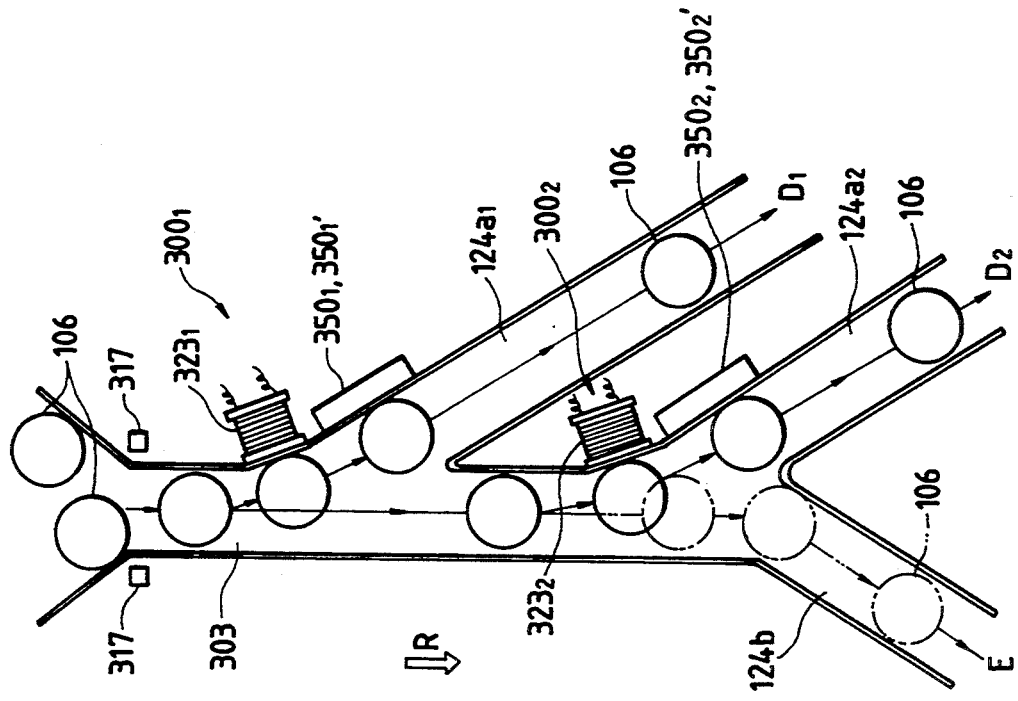
FIGS. 41 shows a top view showing essential components of another example of the shoe returning or shifting mechanisms in the sorting conveyor according to the present invention.

While there has been described in connection with the preferred embodiments of the shoe returning or shifting mechanism, the invention should not be restricted thereto or thereby. Various changes and modifications may be made therein without departing from the spirit of the invention. For example, as shown in FIG. 41, the arrangement shown in FIG. 12 may be modified to have first and second shoe returning or shifting mechanisms $300_1$ and $300_2$ which are alternately used to prevent the thermal damage caused on the electromagnet 323 and the electromagnet 350' due to the excessive continuous energization thereof. Also, the arrangement shown in FIG. 12 may be modified, as shown in FIG. 42, to include a plurality of independent electromagnet elements $323_1$ and $323_2$ which are alternately used to prevent the thermal damage and a yoke 380 having a slit 390 to attain the smooth guide of the projected member 106 therealong and produce the close-looped magnetic flux therefrom. Moreover, the support shaft guide member 150b described in connection with FIGS. 27, and 44–47 may be provided upstream of the common junction 307. Furthermore, one of the branch rail 124a and 124b may be arranged linearly with respect to the shoe centering guide rail 303.

Next, a modification of a projected member and a cross section portion of guide rails will be described hereunder.

Figure 14:
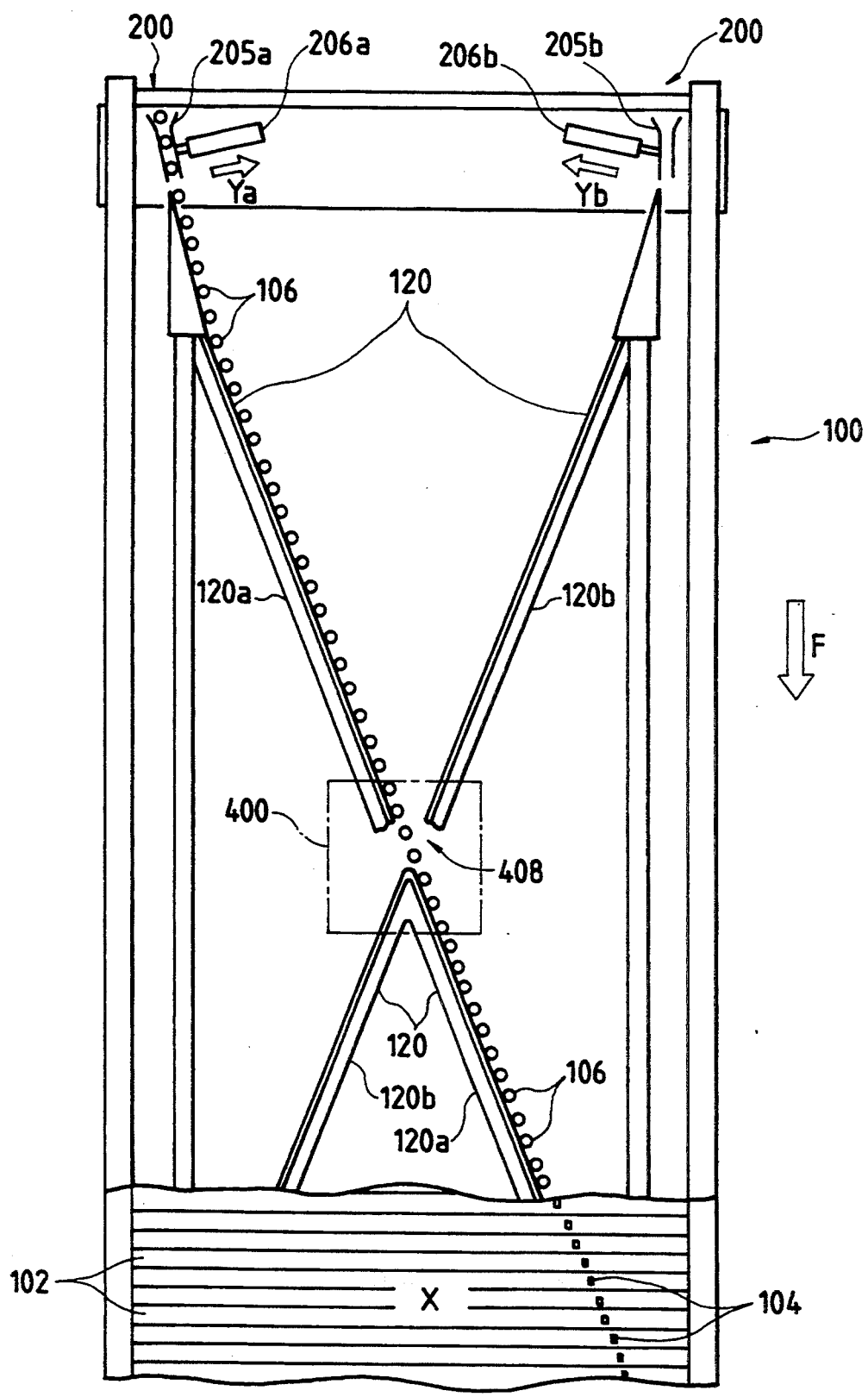
FIG. 14 is a top view, with parts cut away, showing essential components of the sorting conveyor.

As shown in FIG. 14, the sorting device according to the present invention has a conveying surface which is formed by arranging a plurality of slats 102 side by side. The conveying surface is driven downwardly in FIG. 14 as indicated by the arrow F through drive chains 108 (not shown in FIG. 14) or the like. Each of the slats 102 has a moving shoe 104 with a projected member 106 which is extended below the conveying surface. More specifically, the moving shoe 104 is loosely mounted on the slat 102 in such a manner that it is slidable longitudinally of the slat 102.

A guide rail 120 adapted to guide the projected members 106 of the moving shoes 104 is installed under the conveying surface. The guide rail 120, as shown in FIG. 14, comprises: a first guide rail 120a which is extended from the upper left end of the conveying surface to the lower right end; and a second guide rail 120b which is extended from the upper right end of the conveying surface to the lower left end. That is, the two guide rails 120a and 120b cross each other.

Two change-over mechanism 200 are provided in the upper left end and upper right end at the upstream ends of those guide rails 120a and 120b, respectively. As shown in FIG. 14, the change-over mechanisms 200 may be made up of actuators 206a and 206b having introducing members 205a and 205b for introducing the projected members 106 into the guide rails 120a and 120b, respectively, or otherwise may have the arrangements described in connection with FIGS. 4-10 or the like. In response to a sorting signal, the actuator 206a (or 206b) is driven to move the introducing member 205a (or 205b) in the direction of the arrow Ya (or Yb), so that each of the projected members 106 coming to the upstream end of the conveying surface are guided to the guide rail 120a (or 120b). The actuators 206a and 206b are made up of air cylinders, solenoid valves or the like. Thereafter, the projected members 106 are guided along the guide rail 120a (or 120b) while being moved in the direction of the arrow F, as a result of which the moving shoes 104 form a conveying path which is extended obliquely over the conveying surface.

An article (not shown in FIG. 14) supplied onto the conveying surface is moved along the conveying path thus formed to the right or left end of the conveying surface, thus being classified.

In order to allow the projected member 106 to go obliquely over the whole width of the conveying surface, in the cross section 400 where the guide rails 120a and 120b cross each other (hereinafter referred to as "a guide rail cross section 400", when applicable), each of the guide rails 120a and 120b is partially omitted a predetermined length from the intersection of the guide rails 120a and 120b to the extent that the projected member 106 can pass therethrough; that is, each of the guide rails 120a and 120b is made up of two parts with a space 408 therebetween which corresponds to the aforementioned length.

FIG. 15 shows an example of a guide means provided at the guide rail cross section 400 or the space 408, and also shows an example of a modification of the projected member 106, in accordance with the present invention.

Each projected member 106 comprises: a supporting shaft 135 protruded below the conveying surface; and a rotary shoe 416 whose section is in the form of an elongated ellipse; and a bearing 140. The rotary shoe 416 and the bearing 140 are coaxially mounted on the supporting shaft 135 (cf. FIG. 16). The projected members thus constructed are moved downwardly in FIG. 15 along the guide rail 120a (or 120b) as indicated by the arrow B (or A).

The rotary shoe 416 may be modified in configuration: For instance, its section may be in the form of a rhombus, an arc, a rectangle, a chamfered rectangle, or in the form which is obtained by cutting a convex lens along the diameter, or tapered towards both ends.

In the guide rail cross section 400, bearing guides 418 for guiding the bearings 140, and rotary shoe guides 422 for guiding the rotary shoes are provided. The bearing guides 418 have a passage width wide enough for the bearings 140 to pass through. Each of the rotary shoe guides 422 comprises: a rotary shoe passing section 419 having a passage width which is wide enough for the minor diameter portion of the rotary shoe 416 to pass through; and a rotary shoe introducing section 421 which is expanded upstream (upwardly in FIG. 15) of the upstream end portion 420 of the rotary shoe passing section 419. More specifically, the rotary shoe introducing sections 421 are so arranged as to have the same central lines C as the bearing guides 418.

The behavior of each of the projected members 106 in the cross section 400 thus designed will be described with reference to the case where it is moved along the guide rail 120a.

The projected member 106 is guided into the guide rail cross section 400 with the bearing 140 abutting against the guide rail 120a. In this operation, the elongated elliptic rotary shoe 416 reaches the upstream portion of the guide rail cross section 400 with its major diameter's ends directed at random. As the projected member 106 moves downwardly, the bearing 140 is guided along the bearing guide 418 in the direction of the arrow B in FIG. 15, so that the side walls of the major diameter portion of the rotary shoe 416 are abutted against the rotary shoe introducing section 421, and therefore the rotary shoe 416 is moved downwardly while being turned. Thus, the rotary shoe 416 is guided to the rotary shoe passing section 419 while being directed in such a manner that the major diameter portion is on the central line C of the bearing guides 418.

Baffle plates 423 are disposed upstream of the guide rail cross section 400 in such a manner that they are inclined downstream and protruded towards the guide rail, and are so spaced as to allow the passage of the minor diameter portion of the rotary shoe 416. In this case, before the rotary shoe is led into the rotary shoe introducing section 421, the major diameter portion of the rotary shoe 416 is turned so as to be in parallel with the central line C; that is, it is directed preliminarily (as a projected member 106a in FIG. 15). As a result of this preliminary direction, the rotary shoe 416 is more smoothly led into the rotary shoe introducing section 421 and the rotary shoe passing section 419.

As was described above, the rotary shoe, after being directed by the rotary shoe introducing section 421, is guided into the rotary shoe passing section 419. Therefore, even when the rotary shoe 416 is located at the intersection in the guide rail cross section 400 (as the rotary shoe 416 shaded in FIG. 15), it is positively moved straightly in the cross section 400, because when the front end of the major diameter portion reaches the rotary shoe passing section 419a which is provided in the cross section 400 on the downstream side, the rear end of the major diameter portion is still held on the rotary shoe passing section 419 on the upstream side. Thus, the rotary shoe 416 is positively and smoothly guided into the rotary shoe passing section 419a on the downstream side.

As was described above, while the rotary shoe 416 is guided into the rotary shoe passing section, the bearing 140 is guided by the bearing guide 418 (cf. FIG. 16). Therefore, the projected member 106 is positively moved straightly; that is, it is positively moved from the guide rail on the upstream side to the guide rail on the downstream side.

Figure 43:
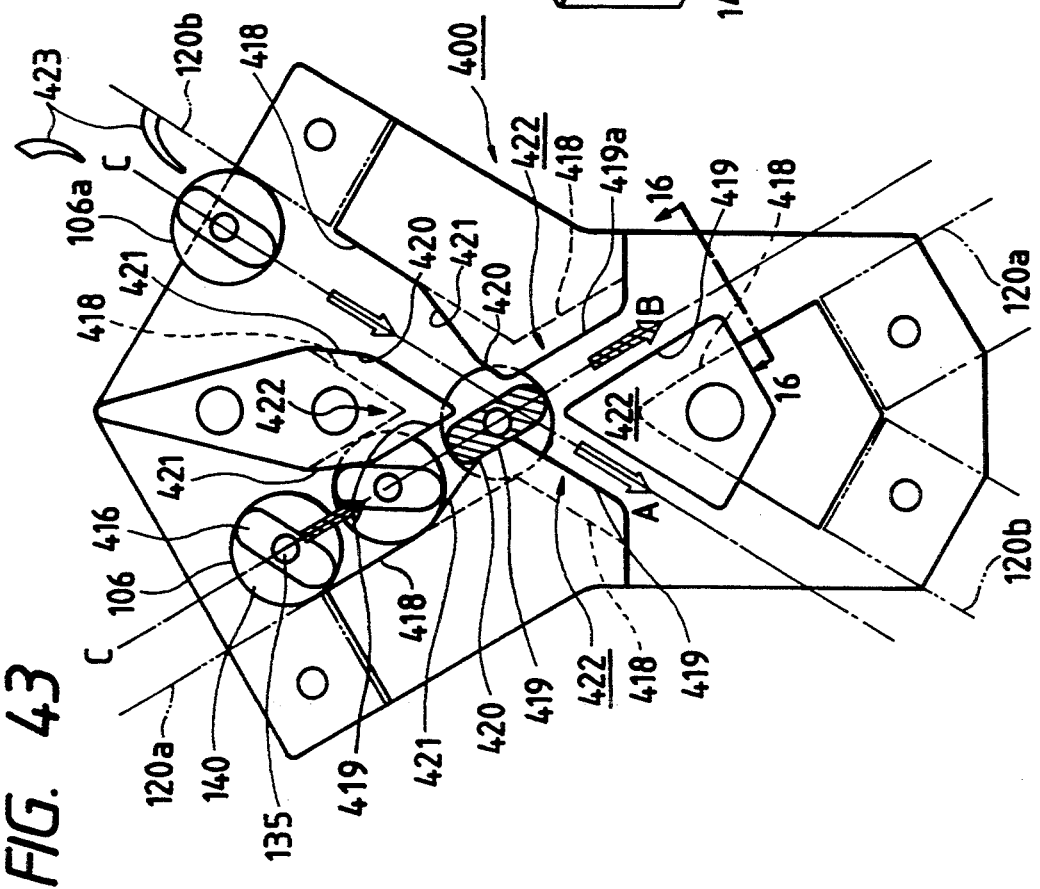
FIG. 43 shows a top view showing essential components of another example of the guide rail cross section in the sorting conveyor according to the present invention.

Although the rotary shoe passing section 419 on the upstream side defining a passage having the same width as of the rotary shoe 416 is shown in FIG. 15, it is preferable for smooth guide purpose to have a clearance between the rotary shoe 416 and the rotary shoe passing section 419. More specifically, it is preferable that the rotary shoe 416 passes through the rotary shoe guide 416 in such a manner that the rotary shoe slides on a lower portion of the rotary shoe guide 419 while remaining a clearance from a upper portion of the rotary shoe guide 419 as shown in FIG. 43. In this case, the center line of the rotary shoe guide 419 is not coincident with the center line C of the bearing guides 418.

The projected member 106 described with reference to FIGS. 15 and 16 may be modified in various manners. For instance, the bearing 140 and the elongated elliptic-rotary shoe 416 may be mounted on the supporting shaft 135 which is protruded below the conveying surface, in a manner as that shown in FIG. 17. More specifically, one end portion of the major diameter portion of the rotary shoe 416 is loosely mounted on the supporting shaft 135, so that the rotary shoe 416 and the bearing 140 are rotatable independently of each other. As is apparent from FIG. 17, in the projected member 106, the other end portion of the major diameter portion of the rotary shoe 416 is extended outside the bearing 140, and it is turnable about the supporting shaft 135 as a free end portion. However, in order to regulate this turning of the rotary shoe 416, turn regulating members 424 may be embedded in the upper surface of the bearing 140 so as not to direct the free end of the rotary shoe 416 to the downstream side.

Figure 17:
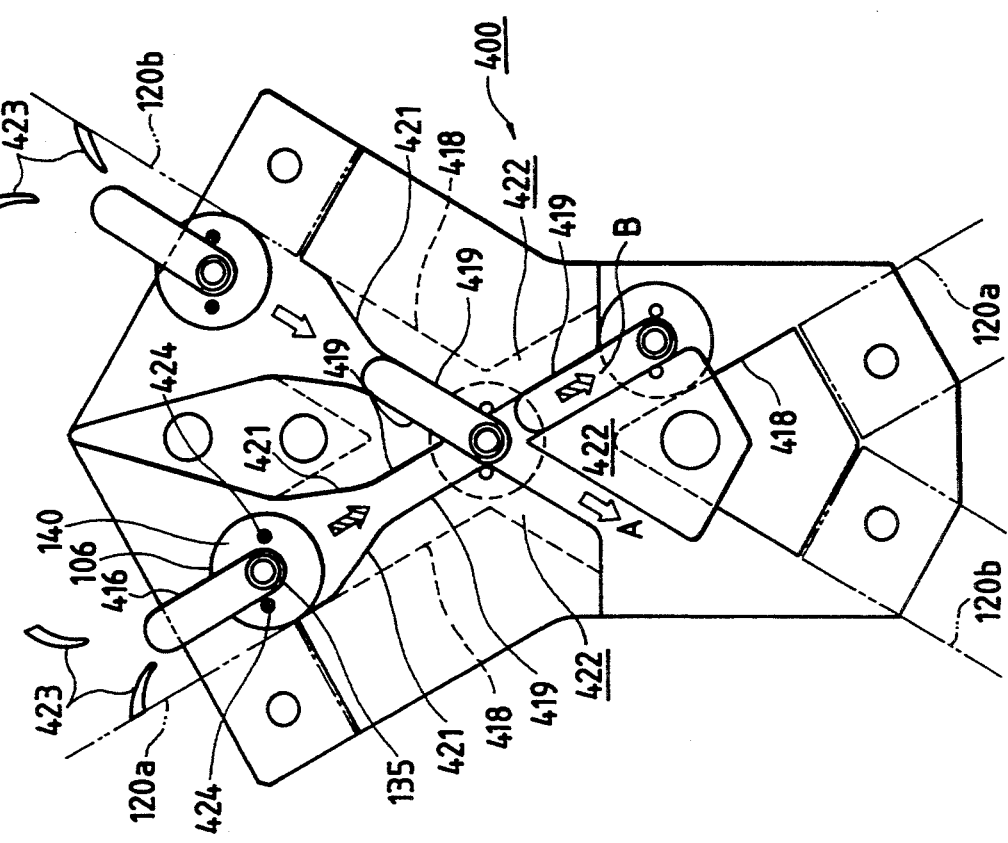
FIG. 17 is a top view showing essential components of another example of the guide rail cross section in the sorting conveyor according to the invention.

The behavior of each of the projected members in the guide rail cross section 400 will be described with reference to FIG. 17.

The guide rail cross section 400 includes: bearing guides 418; and rotary shoe guides 422 comprising a rotary shoe introducing section 421 and a rotary shoe passing section 419, similarly as in the guide rail cross section 400 shown in FIG. 15. The bearing 140 is moved obliquely downwardly in FIG. 17 along the guide rail 120a or 120b, so that the projected member 106 is led into the cross section 400. Therefore, with the front end portion of the major diameter of the rotary shoe 416 directed by the baffle plates 423 and the rotary shoe introducing section 421, the rotary shoe 416 is allowed to move straightly, in the direction of the arrow A (or B) in FIG. 17, through the rotary shoe passing section 419.

As is apparent from the above description, similarly as in the case of FIG. 15, the rotary shoe 416 is guided by the rotary shoe passing section 419 while the bearing 140 is guided by the bearing guide 418, so that the projected member 106 is positively moved straightly in the cross section 400; that is, it is smoothly moved from the guide rail on the upstream side to the guide rail on the downstream side.

In the invention, the above-described guide means and projected member are employed; however, it should be noted that the invention is not limited thereto or thereby. That is, it may be modified in various manners without departing from the spirit of the invention.

Figure 18:
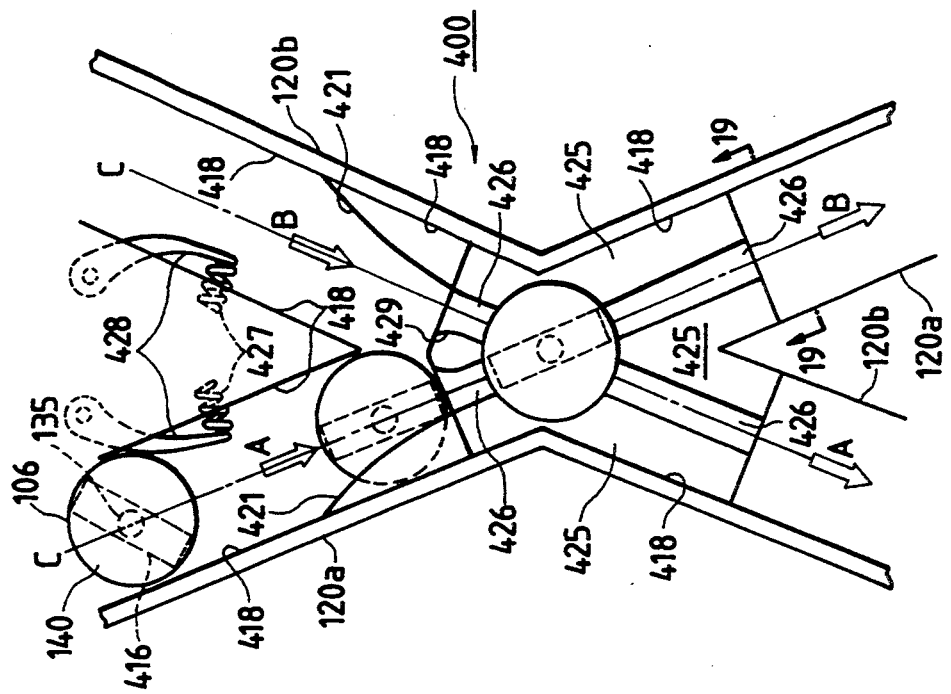
FIG. 18 is a top view showing essential components of yet another example of the guide rail cross section in the sorting conveyor according to the invention.
Figure 19:
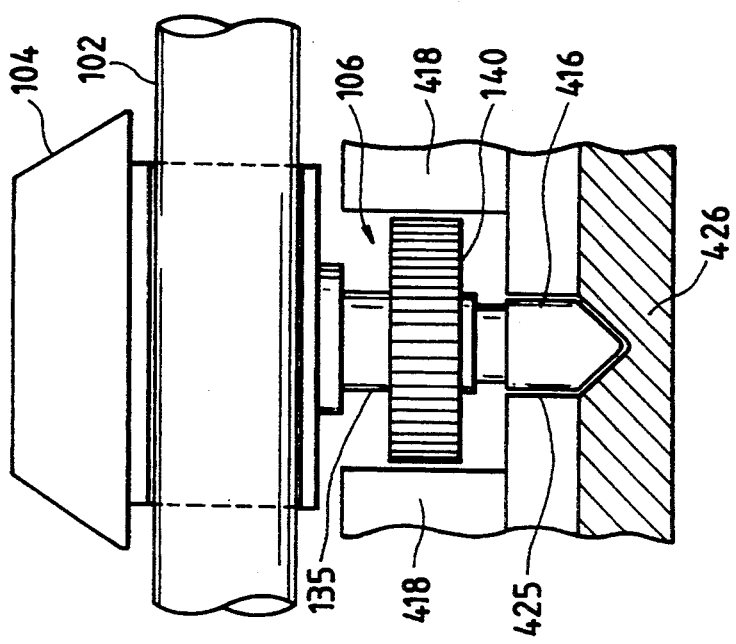
FIG. 19 is a fragmental view taken in the direction of the arrow substantially along line 19—19 in FIG. 18, showing the guide rail cross section.

For instant, the projected member 106 of the moving shoe 104 may be modified as shown in FIG. 18 and 19. A bearing 140 is mounted on a supporting shaft 135 extended below the conveying surface, and a skate-edge-shaped rotary shoe 416 is rotatably mounted on the lower end portion of the supporting shaft 135. The rotary shoe 416 is V-shaped in section, and has a length substantially equal to the diameter of the bearing.

In the guide rail cross section 400, rotary shoe guide walls 425 and rotary shoe guide grooves 426 are provided which are shaped according to the cross section of the rotary shoe 416. The rotary shoe guide walls 425 and the rotary shoe guide grooves 426, as shown in FIG. 18, are so arranged as to have the same central line C as the bearing guide 418. In the region upstream of each of the rotary shoe guide walls 425, a rotary shoe introducing sections 421 are provided each of which is gradually widened upwardly, and merges with the respective rotary shoe guide wall 425.

The behavior of the projected member 106 in the guide rail cross section 400 will be described with reference to FIG. 18. The bearing 140 is obliquely and downwardly moved along the guide rail 120a (or 120b) in FIG. 18, so that the projected member 106 is led into the guide rail cross section 400. Therefore, the rotary shoe 416 is positioned longitudinally by both a moving direction regulating member 428 urged by a spring 427, and the rotary shoe introducing section 421, so that the skate-edge portion of the rotary shoe 416 is guided into the rotary shoe guide groove 426. Thus, the side walls of the rotary shoe 416 are allowed to move along the rotary shoe guide walls 425 while the skate-edge portion (or the end portion) thereof is allowed to slide along the rotary shoe guide groove 426. That is, the rotary shoe 416 is moved straightly along the guide rail central line C in the direction of the arrow A (or B).

Instead of the moving direction regulating members 428, the baffle plates as shown in FIG. 15 may be employed. The upstream end portion 429 of each of the rotary shoe guide grooves 426 may be so formed that the guide groove width is larger than is actually required. In this case, the rotary shoe 416 can be guided more smoothly.

As is apparent from the above description, similarly as in the case of FIG. 15, the rotary shoe 416 is guided by both the rotary shoe guide walls 425 and the rotary shoe guide groove 426, while the bearing 140 is guided by the bearing guide 418, so that the projected member 106 is positively moved straightly in the guide rail cross section 400; that is, it is smoothly moved from the guide rail on the upstream side to the guide rail on the downstream side.

Figure 20:
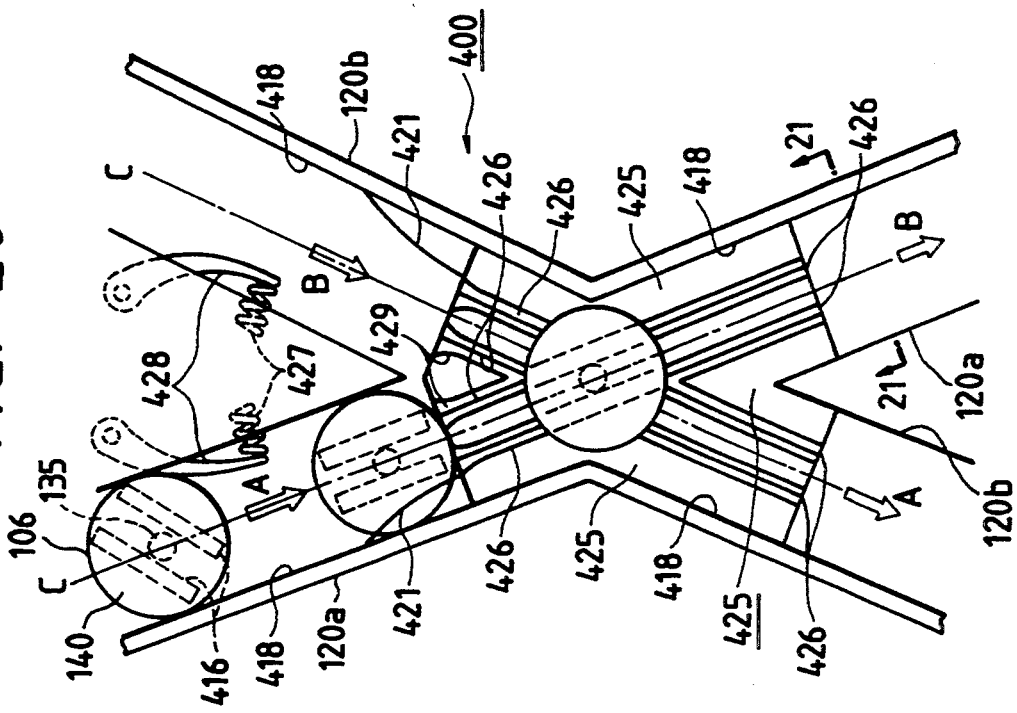
FIG. 20 is a top view showing essential components of still another example of the guide rail cross section in the sorting device according to the invention.

The skate-edge-shaped end portion of the rotary shoe 416 may be modified in configuration. For instance, as shown in FIG. 20 and 21, the end portion may be so shaped as to have two parallel edges. In this case, as shown in FIG. 20, two guide grooves are formed along the guide rail's central line C in conformance with the configuration of the skate-edge-shaped end portion of the rotary shoe 416.

In the case, too, where the rotary shoe 416 is modified as described above, the projected member 106 operates in the same manner as in the case of FIG. 19. That is, the rotary shoe 416 is guided by the rotary shoe guide walls 425 and the rotary shoe guide groove 416, while the bearing 140 is guided by the bearing guide 418, so that the projected member is positively moved straightly in the cross section 400; that is, it is smoothly moved from the guide rail on the upstream side to the guide rail on the downstream side.

Figure 26:
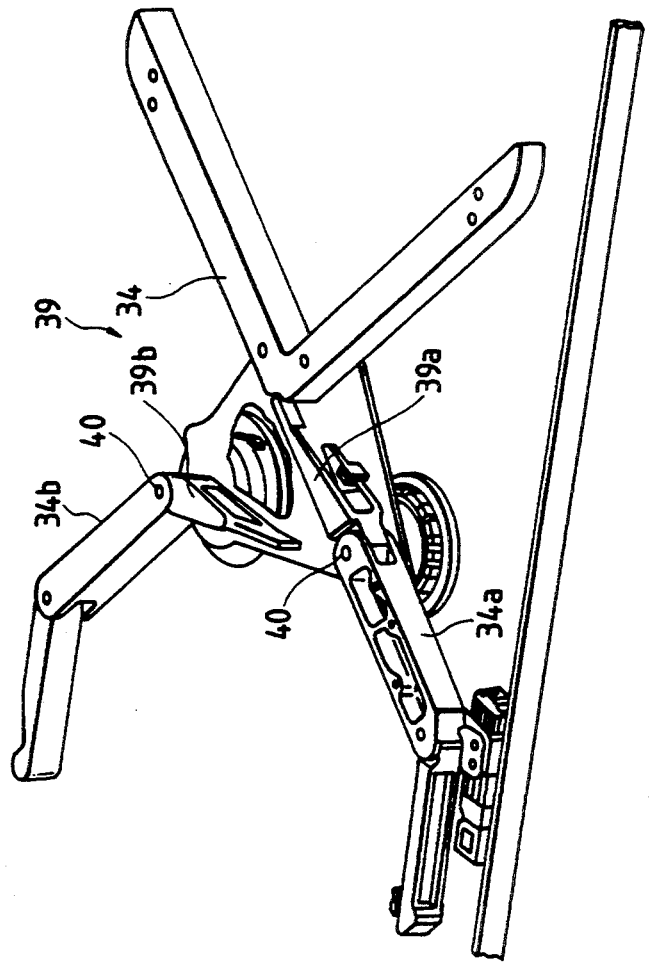
FIG. 26 is a perspective view showing another example of the conventional guide rail cross section.

As was described above, the conventional mechanism, as typically shown in FIG. 26, has the change-over members arranged in the cross section of the guide rails; that is, the guide rails are mechanically switched to guide the projected member to the guide rail on the downstream side. On the other hand, with the cross section of the guide rails designed according to the invention, the conveying paths can be switched without use of such change-over members. Hence, in switching the conveying paths, no operating noises are produced, and the working environment is kept quiet. Furthermore, in the sorting device of the invention, it is unnecessary to arrange the change-over member at each conveying path switching point. Therefore, the sorting device is reduced in manufacturing cost as much.

Figure 24:
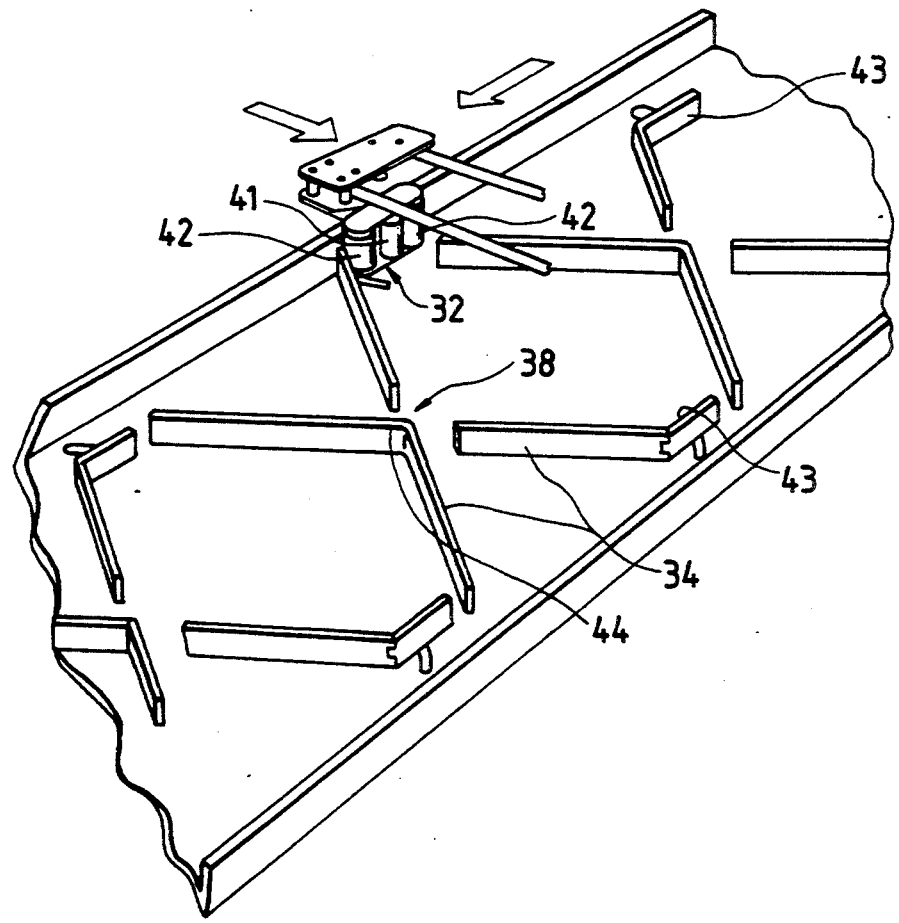
FIG. 24 is a perspective view showing one example of a conventional guide rail cross section in a sorting device.
Figure 25:
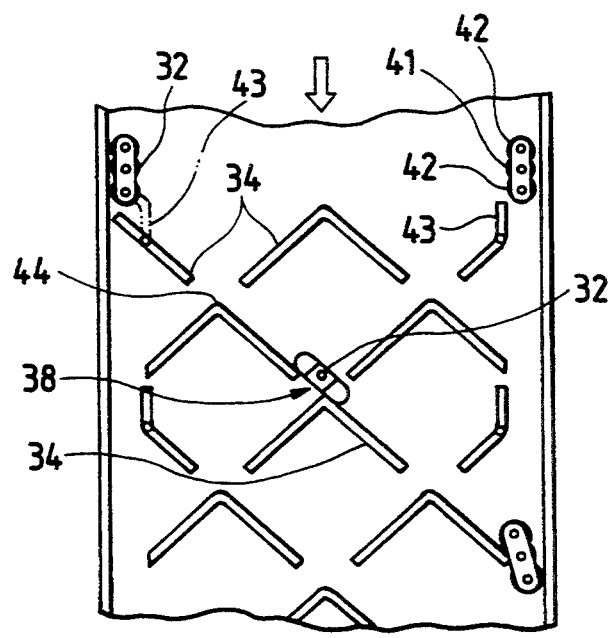
FIG. 25 is a top view of the guide rail cross section shown in FIG. 24, for a description of the movement of a projected member in the guide rail cross section.

In the guide rail structure of the invention, unlike the conventional one shown in FIGS. 24 and 25, the rotary shoe and the bearing are guided by the rotary shoe guide and the bearing guide, respectively. Therefore, the projected member is positively moved straightly in the cross section; that is, it is smoothly moved from the guide rail on the upstream side to the guide rail on the downstream side.

Thus, with the cross section of the guide rails according to the invention, the articles on the conveying surface can be classified positively, smoothly and quickly.

While there has been described in connection with the preferred embodiments of this invention, it will be obvious to those skilled in the art that various changes and modifications may be made therein without departing from the invention.

What is claimed is:

1. A change-over device adapted to be used in a slat conveyor type sorting apparatus including a plurality of slats arranged side by side to form a conveying surface on which articles are loaded, drive means for moving said slats in a direction substantially perpendicular to a longitudinal direction of said slats to convey said articles together with said slats and moving shoes mounted on corresponding slats and movable in said longitudinal direction, each of said slats defining a first side and a second side opposite said first side, said moving shoes being located on said first side, said change-over device comprising:

a projected member protruded from each of said moving shoes and located on said second side;

first, second and third guide rails installed on said second side and substantially parallel to said conveying surface for guiding said projected member together with said moving shoe when said slats are moved by said drive means, wherein said second and third guide rails branch from said first guide rail so that said projected member moving along said first guide rail is selectively introduced into one of said second and third guide rails, said second guide rail including a first side wall and a second side wall; and a magnet means, provided on said second guide rail so as to constitute a part of said first side wall and with at least a portion of said magnet means being located opposite from said second side wall to define an inlet space therebetween, for operatively attracting said projected member so as to be introduced into said inlet space, wherein said projected member introduced into said inlet space is forcibly guided by said first and second side walls without continuing magnetic attraction.

2. The change-over device according to claim 1, wherein said magnet means includes an electromagnet.

3. The change-over device according to claim 2, wherein said first and third guide rails extend linearly relative to each other so that said projected member moving along said first guide rail is introduced into said third guide rail when said electromagnet is not energized.

4. The change-over device according to claim 1, wherein said first side wall comprises a fixed side wall along which said projected member is guided, said magnet means constituting a part of said fixed side wall.

5. The change-over device according to claim 4, wherein said magnet means includes an electromagnet.

6. A change-over device adapted to be used in a slat conveyor type sorting apparatus including a plurality of slats arranged side by side to form conveying surface on which articles are loaded, drive means for moving said slats in a direction substantially perpendicular to a longitudinal direction of said slats to convey said articles together with said slats and moving shoes mounted on corresponding slats and movable in said longitudinal direction, each of said slats defining a first side and a second side opposite said first side, said moving shoes being located on said first side, said change-over device comprising:

a projected member protruded from each of said moving shoes and located on said second side;

first, second and third guide rails installed on said second side and substantially parallel to said conveying surface for guiding said projected member together with said moving shoe when said slats are moved by said drive means, wherein said second and third guide rails branch from said first guide rail so that said projected member moving along said first guide rail is selectively introduced into one of said second and third guide rails; and a magnet means provided on said second guide rail for operatively attracting said projected member toward said second guide rail, wherein said second guide rail includes a fixed side wall along which said projected member is guided, said magnet means constituting a part of said fixed side wall and including an electromagnet, and wherein said magnet means further includes a yoke forming a closed loop of magnetic flux generated from said electromagnet when being in contact with said projected member.

7. A change-over device adapted to be used in a slat conveyor type sorting apparatus including a plurality of slats arranged side by side to form a conveying surface on which articles are loaded, drive means for moving said slats in a direction substantially perpendicular to a longitudinal direction of said slats to convey said articles together with said slats and moving shoes mounted on corresponding slats and movable in said longitudinal direction, each of said slats defining a first side and a second side opposite said first side, said moving shoes being located on said first side, said change-over device comprising:

a projected member protruded from each of said moving shoes and located on said second side;

first, second and third guide rails installed on said second side and substantially parallel to said conveying surface for guiding said projected member together with said moving shoe when said slats are moved by said drive means, wherein said second and third guide rails branch from said first guide rail so that said projected member moving along said first guide rail is selectively introduced into one of said second and third guide rails; and a magnet means provided on said second guide rail for operatively attracting said projected member toward said second guide rail, wherein said second guide rail includes a fixed side wall along which said projected member is guided, said magnet means constituting a part of said fixed side wall and including an electromagnet, and wherein said electromagnet includes a plurality of electromagnet elements selectively used to attract said projected member to said electromagnet.

8. The change-over device according to claim 1, wherein said magnet means includes a permanent magnet.

9. The change-over device according to claim 8, wherein said first side wall comprises a wall movable toward and away from said first guide rail, said permanent magnet being fixed on said movable wall.

10. The change-over device according to claim 8, wherein first side wall comprise a fixed side wall along which said projected member is guided, said permanent magnet forming a part of said fixed side wall.

11. The change-over device according to claim 1, further comprising:
a second magnet means for operatively attracting said projected member toward said third guide rail.

12. The change-over device according to claim 11, wherein third guide rail includes a further fixed side wall along which said further projected member is guided, and said second magnet means constitutes a part of said fixed side wall.

13. The change-over device according to claim 1, wherein said change-over device further comprises:
a positioning means located on said first guide rail for positioning said projected member so as to cause said projected member to be brought into contact with said first side wall.

14. The change-over device according to claim 13, wherein said positioning means includes an electromagnet.

15. The change-over device according to claim 13, wherein said projected member includes a support shaft and a rotary member rotatably mounted on said support shaft, and said positioning means includes a support shaft guide for guiding said support shaft so as to bring said rotary member into contact with said side wall.

16. The change-over device according to claim 1, wherein said first guide rail defines a central axis, and said second and third guide rails includes respective side walls which are jointed together at a common junction, and wherein said common junction is laterally deviated from said central axis.

17. A change-over device adapted to be used in a slat conveyor type sorting apparatus including a plurality of slats arranged side by side to form a conveying surface on which articles are loaded, drive means for moving said slats in a direction substantially perpendicular to a longitudinal direction of said slats to convey said articles together with said slats and moving shoes mounted on corresponding slats and movable in said longitudinal direction, each of said slats defining a first side and a second side opposite said first side, said moving shoes being located on said first side, said change-over device comprising:
a projected member having a support shaft protruded from each of said moving shoes and located on said second side and a rotary member rotatably mounted on said support shaft;
first, second and third guide rails installed on said second side and substantially parallel to said conveying surface for guiding said rotary member together with said moving shoe when said slats are moved by said drive means, wherein said second and third guide rails branch from said first guide rail so that said rotary member moving along said first guide rail is selectively introduced into one of said second and third guide rails; and a magnet means provided on said second guide rail for operatively attracting said rotary member toward said second guide rail, said magnet means including an electromagnet located immediately downstream of said first guide rail, a pair of yoke members connected to said electromagnet and extending along said second guide rail to form a smooth and continuous guide surface on which said rotary member is guided when said electromagnet is energized, and a plurality of magnets interposed and held between said yoke members and disposed downstream of said electromagnet and along said guide surface.

18. The change-over device according to claim 17, wherein each of said yoke members is formed with a slit between said electromagnet and a most upstream one of said magnets.

19. The change-over device according to claim 17, wherein said first guide rail includes a support shaft guide for guiding said support shaft so as to bring said rotary member into contact with said guide surface.

20. The change-over device according to 17, further comprising:
a support shaft guide for guiding said support shaft therealong so as to forcibly moving said rotary member, which is attracted by said electromagnet, along said guide surface before said rotary member is completely introduced into said second guide rail.

21. A slat conveyor type sorting apparatus, comprising:
a plurality of slats arranged side by side to form an endless conveyor having a right hand end and a left hand end;
drive means for driving said endless conveyor;
moving shoes mounted on corresponding slats and movable from one of said right and left hand ends to the other; wherein said endless conveyor includes:
a conveying region in which articles are loaded from an upstream conveyor on a conveying surface and sorted therefrom while being conveyed, and a returning region located opposite to said conveying region, said conveying region having a first sorting area in which a corresponding article is sorted from said endless conveyor to a first downstream conveyor extending from said left hand end by moving said moving shoes from said right hand end to said left hand end, and a second sorting area in which a corresponding article is sorted from said endless conveyor to a second downstream conveyor extending from said right hand end by moving said moving shoes from said left hand end to said right hand end; and wherein
said slat type conveyor further comprises:
a shoe shifting device located in said returning region for positioning respective moving shoes, which are to be used for sorting an article to be loaded from said upstream conveyor to said endless conveyor, at one of said left hand side and said right hand side in accordance with a sorting data of said article, wherein said shoe shifting device comprises:
a projected member protruded from each of said moving shoes and located on said second side;

first, second and third guide rails installed on said second side and substantially parallel to said conveying surface for guiding said projected member together with said moving shoe when said slats are moved by said drive means, wherein said second and third guide rails branch from said first guide rail so that said projected member moving along said first guide rail is selectively introduced into one of said second and third guide rails, said second guide rail including a first side wall and a second side wall; and a magnet means, provided on said second guide rail so as to constitute a part of said first side wall and with at least a portion of said magnet means being located opposite from said second side wall to define an inlet space therebetween, for operatively attracting said projected member so as to be introduced into said inlet space, wherein said projected member introduced into said inlet space is forcibly guided by said first and second side walls without continuing magnetic attraction.

22. A classifying device for a conveyor comprising a plurality of slats arranged side by side for conveying articles, said classifying device comprising moving means for moving articles loaded on said conveyor longitudinally of said slats at an article classifying position, by guiding projected members protruded from said moving means along a pair of guide rails installed on a rear side of the article conveying surface of said conveyor in such a manner that said pair of guide rails extend obliquely over the entire width of said article conveying conveyor and cross each other, wherein each projected member comprises: a bearing rotatably mounted on a supporting shaft protruded on the side of said guide rails; and a rotary shoe including a major diameter portion and a minor diameter portion, and in the cross region of said guide rails, a bearing guide for guiding said bearing of each projected member, and a rotary shoe guide are provided for each of said pair of guide rails, said rotary shoe guide comprising:

a rotary shoe introducing section for regulating the direction of the major diameter portion of each rotary shoe; and a rotary shoe passing section which guides said rotary shoes, having a passageway which is wide enough for the minor diameter portion of each rotary shoe to pass through.

* * * * *